United States Patent
Fukaya et al.

(10) Patent No.: US 7,813,544 B2
(45) Date of Patent: Oct. 12, 2010

(54) ESTIMATION DEVICE

(75) Inventors: Naoki Fukaya, Obu (JP); Mikio Shimizu, Kariya (JP); Shin Ishii, Ikoma (JP); Tomohiro Shibata, Nara (JP); Takashi Bando, Uji (JP)

(73) Assignees: Denso Corporation, Kariya (JP); National University Corporation Nara Institute of Science and Technology, Ikoma (JP)

( * ) Notice: Subject to any disclaimer, the term of this patent is extended or adjusted under 35 U.S.C. 154(b) by 945 days.

(21) Appl. No.: 11/642,763

(22) Filed: Dec. 20, 2006

(65) Prior Publication Data

US 2007/0147661 A1 Jun. 28, 2007

(30) Foreign Application Priority Data

Dec. 21, 2005 (JP) .............................. 2005-368124

(51) Int. Cl.
G06K 9/00 (2006.01)
G06K 9/62 (2006.01)

(52) U.S. Cl. ...................................... 382/155; 382/118

(58) Field of Classification Search ......... 382/115–118, 382/155–161
See application file for complete search history.

(56) References Cited

U.S. PATENT DOCUMENTS

2003/0023319 A1* 1/2003 Andersen et al. ............... 623/24
2003/0215141 A1* 11/2003 Zakrzewski et al. ......... 382/190

FOREIGN PATENT DOCUMENTS

WO WO 2004/004320 1/2004

OTHER PUBLICATIONS

Office action dated Jun. 24, 2008 in German Application No. 10 2006 059 172.0 with English translation thereof.
Bilmes, Jeff A., "A Gentle Tutorial of the EM Algorithm and its Application to Parameter Estimation for Gaussian Mixture and Hidden Markov Models", International Computer Science Institute and Computer Science Div. Dept. of Electrical Engineering & Computer Science, U.S. Berkeley, TR-97-021, Apr. 1998.
Blake, A.; Curwen, R.; Zisserman, A., "A Framework for Spatio-Temporal Control in The Tracking Of Visual Contours", Int. Journal of Computer Vision, 11, 2, pp. 127-145 (1993).
Doucet, A.; Godsill, S.; Andrieu, C.; "On Sequential Monte Carlo Sampling Methods for Bayesian Filtering", Statistics and Computing (2000) 10, pp. 197-208.

(Continued)

*Primary Examiner*—Vu Le
*Assistant Examiner*—Alex Liew
(74) *Attorney, Agent, or Firm*—Harness, Dickey & Pierce, PLC

(57) ABSTRACT

An estimation device estimates a hidden state of an estimation subject from an observable state in a manner of a time series. The observable state is observed from the hidden state of the estimation subject under a procedure that has a hierarchical structure, which includes the hidden state of the estimation subject, the observable state, and an intermediate hidden state therebetween. The estimation device includes an estimation subject hidden state predicting means, an intermediate hidden state predicting means based on the state transition structure of the hidden state of the estimation subject, an intermediate hidden state likelihood observing means, an intermediate hidden state estimating means, an estimation subject hidden state likelihood observing means, estimation subject hidden state estimating means, an intermediate hidden state predicting means based on the state transition structure of the intermediate hidden state, and the mixing means.

6 Claims, 15 Drawing Sheets

OTHER PUBLICATIONS

Casella, G.; Robert, C.; "Rao-Blackwellisation of Sampling Schemes", Biometrika (1996), 83, 1, pp. 81-94.
Thrun, S.; Fox, D.; Burgard, W.; "Monte Carlo Localization With Mixture Proposal Distribution"; American Association for Artificial Intelligence 2002.

Bando, T.; Shibata, T.; Doya, K.; Ishii, Shin; "Switching Particle Filters for Efficient Real-time Visual Tracking", IEEE 2004.
Rivlin, E.; Rotstein, H.; Zeevi, Y. Y.; "Two-Mode Control: An Oculomotor-Based Approach To Tracking Systems", IEEE Transactions on Automatic Control, vol. 43, No. 6, Jun. 1998.

* cited by examiner

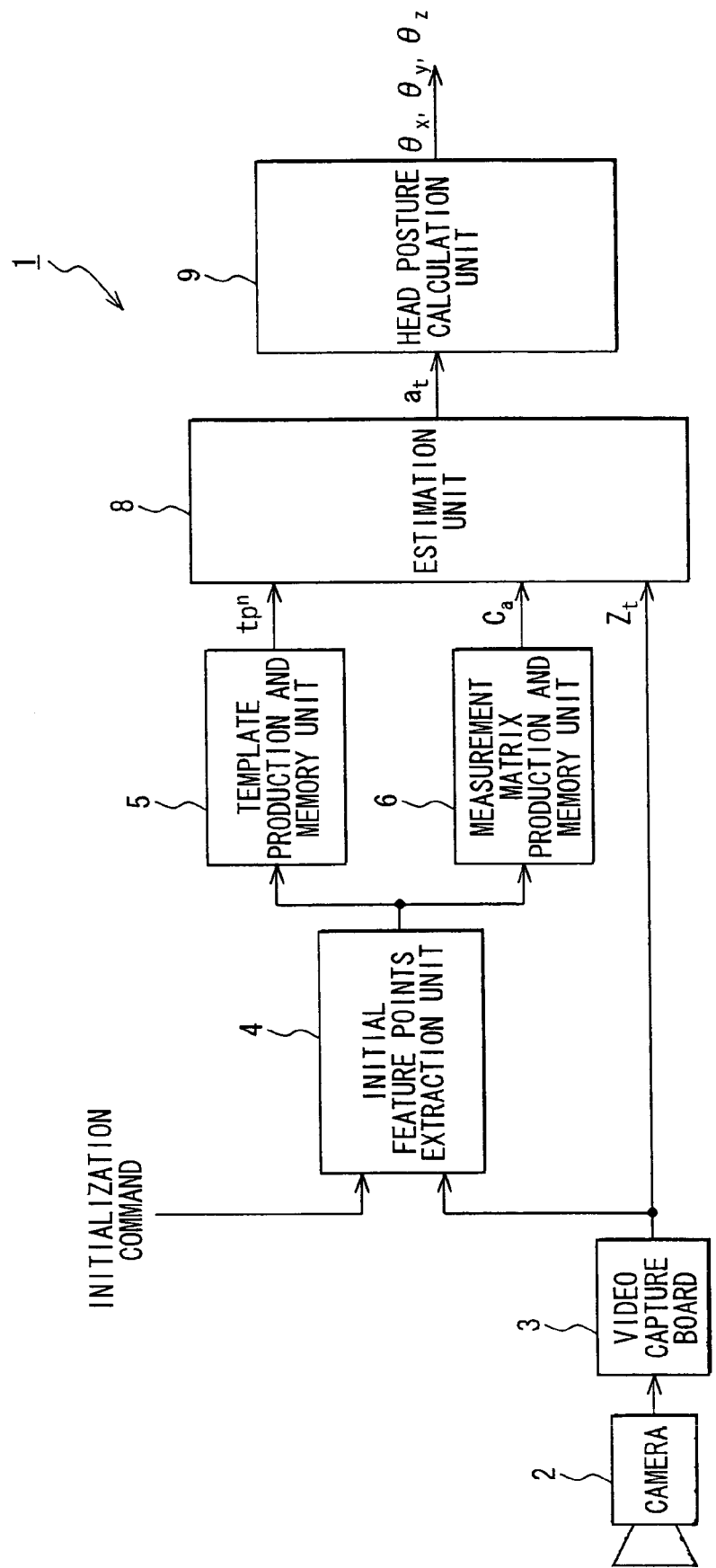

TIME t

SUPERIOR PREDICTED DISTRIBUTION

SUBORDINATE PREDICTED DISTRIBUTION $\alpha_{a,t} p(\tilde{x}_t^{(i)} | a_t)$    $\tilde{x}_t^{(i)}$    $\alpha_{z,t} p(\tilde{x}_t^{(i)} | a_{t-1}, z_{1:t-1})$

ERROR OF ESTIMATED HEAD POSTURE

|  | MEAN SQUARED ERROR [deg] | AVERAGE ERROR STANDARD DEVIATION [deg] |
|---|---|---|
| EM | 6.858±0.041 | 5.252±0.042 |
| $\alpha_a = 1$ | 40.734±40.015 | 10.974±7.479 |
| $\alpha_a = 0$ | 12.030±12.023 | 8.623±7.765 |

# ESTIMATION DEVICE

CROSS REFERENCE TO RELATED APPLICATION

This application is based on and incorporates herein by reference Japanese Patent Application No. 2005-368124 filed on Dec. 21, 2005.

BACKGROUND OF THE INVENTION

1. Field of the Invention

The present invention relates to an estimation device that estimates a hidden state from observed data.

2. Description of Related Art

Conventionally, an image that is taken by a camera has been used as observed data in order to detect a state of an estimated object (e.g., a head posture (the state) of a driver (the estimated object) while driving) without restraining the estimated object.

However, in such a case, only brightness and color information of each picture element are directly obtained from the image as the observed data, and thus the head posture cannot be directly detected from the image.

The state (e.g., the head posture) of the estimated object cannot be directly detected from the observed data (the image), and such the state of the estimated object is defined as a hidden state. Time-series Bayesian estimation is known as a method for calculating posterior probability distribution of the hidden state of the estimated object based on the observed data.

Generally, the time-series Bayesian estimation cannot be analytically solved, since complex integration calculation is involved in deriving distribution of various model variables (including a hidden state variable). Nevertheless, a Kalman filter allows integration calculation, which is involved in calculation of the posterior probability distribution of the hidden state of the estimated object, to be analytically carried out, provided that probability distribution of a model variable conforms to Gaussian distribution, and that a system equation that defines a model has linearity. Using the Kalman filter, a method for rapidly performing the time-series Bayesian estimation is known. (For example, see A. Blake et al. A frame work for spatio-temporal control in the tracking of visual contours. International Journal of Computer Vision, 11, 2, pp. 127-145, 1993.)

However, when it comes to estimation of the driver's head posture, a complex disturbance (non-Gaussian noise) is applied to the observed data in an actual environment. This complex disturbance is caused by a complex movement of a head region, a rapid change in a lighting condition (due to, for example, direct sunlight, west sun, and a street lighting), and existence of shieldings such as the driver's hand and cap. Therefore, because the probability distribution of the model variable does not conform to the Gaussian distribution, or the system equation deviates from the linearity, it is generally difficult to obtain stable estimation accuracy by means of the Kalman filter.

Besides, when the image is used as the observed data, a dimension of the model variable generally often becomes high. Consequently, a very massive amount of throughput is generated due to the above integration calculation, and performing the time-series Bayesian estimation using the Kalman filter in real time is very difficult.

By comparison, a particle filter, which conducts time series estimating and predicting of the hidden state by means of approximative time-series Bayesian estimation, based on the observed data to which the non-Gaussian noise is applied, is known.

The particle filter discretely expresses prior probability distribution and the posterior probability distribution of the hidden state for each instant of time using a finite number of particles, thereby performing the time series estimating and predicting.

The number of particles needs to be large, in order to achieve high approximate accuracy of the posterior probability distribution through the particle filter. On the other hand, the number of particles needs to be curbed for the sake of real-time processing. That is, there is a trade-off relationship between accuracy and processing time when the particle filter is employed.

As a result, a method called Rao-blackwellization, which makes compatible an improvement in estimation accuracy and a curb on a computational complexity using a relatively small number of particles, is known. (For example, see G. Casella and C. Robert. Rao-blackwellization of sampling schemes. Biometrika, 83, 1, pp. 81-94, 1996.) Through the Rao-blackwellization, state variables are divided with analytical integrability, and the particle filter is used only for the state variables that are not analytically integrable, thereby rendering small the dimension involved in estimation using the particle filter.

The Rao-blackwellization is applied to the field of image processing as well, and a method for making compatible the improvement in the estimation accuracy and a curb on the processing time by rendering small the dimension involved in the estimation at the particle filter is known. (For example, see A. Doucet et al. On sequential Monte Carlo sampling methods for Bayesian filtering. Statistics and Computiong, 10, 3, pp. 197-208, 2000.) A probability system (a higher layer) that includes the hidden state of the estimated object and an intermediate hidden state is divided from the probability system (a lower layer) that includes the intermediate hidden state and an observable state. The higher layer allows a linear Gaussian process to be presupposed, whereas the lower layer does not. Generally, this division is made by creating the intermediate hidden state (e.g., coordinates of a plurality of facial feature points in an image plane), which has a causal relationship both with the hidden state of the estimated object and with the observed data, between the hidden state of the estimated object and the observed data. The Kalman filter, for example, is employed for the time series estimating at the higher layer, and the particle filter is employed for the time series estimating at the lower layer. Accordingly, the dimension involved in the estimation at the particle filter is rendered small, so that the improvement in the estimation accuracy and the curb on the processing time can be made compatible.

Additionally, while an application of the Rao-blackwellization requires a part of the state variables being analytically integrable, this is not limited to the Kalman filter that corresponds to a linear Gaussian process model (e.g., a mixed normal distribution model, a hidden Markov model, and a Dirichlet process model).

However, in the above method described in A. Doucet et al. (2000), a result (the posterior probability distribution of the intermediate hidden state) of estimation of the intermediate hidden state through the particle filter at the lower layer is used as the observed data, which is to be employed for estimation of the hidden state of the estimated object at the higher layer. Consequently, a lowering of the estimation accuracy of the intermediate hidden state at the lower layer leads to the lowering of that of the hidden state of the estimated object at the higher layer. Furthermore, once the estimation accuracy of the intermediate hidden state lowers at the lower layer, it has generally been difficult to restore this estimation accuracy to its normal state.

For instance, the particle filter used for estimation at the lower layer may be configured for the time series estimating of the coordinate (the intermediate hidden state) on the image (the observed data), onto which a certain feature point of the driver's face is projected. In such a case, when a similar point (that is referred to as a false feature point) to the feature point exists in the observed data, this false feature point, as well as the feature point, has great likelihood. For this reason, in a case where the feature point moves irregularly and rapidly, for example, a particle group that discretely approximates the priori and posterior probability distributions of the intermediate hidden state may deviate from the feature point and may be captured by the false feature point. Once the particle group is captured by the false feature point, the particle filter, from that time onward, carries out the following observation and estimation using the particle group that conforms to a prediction (the prior probability distribution of the intermediate hidden state), which has been produced from a result (the posterior probability distribution of the intermediate hidden state) of the estimation of the coordinate of this incorrect feature point. Therefore, it becomes difficult to bring the particle group out of an abnormal state in which they track the false feature point.

SUMMARY OF THE INVENTION

The present invention addresses the above disadvantages. Thus, it is an objective of the present invention to provide an estimation device, which allows the Time-series Bayesian estimation to perform more accurate approximate calculation in real time as well as with high accuracy, even in an environment where the non-Gaussian noise exists.

To achieve the objective of the present invention, there is provided an estimation device, which estimates a hidden state of an estimation subject from an observable state in a manner of a time series. The observable state is observed from the hidden state of the estimation subject under a procedure that has a hierarchical structure. The hierarchical structure includes the hidden state of the estimation subject, the observable state, and an intermediate hidden state between the hidden state of the estimation subject and the observable state. The intermediate hidden state has a causal relationship both with the hidden state of the estimation subject and with the observable state. In the hierarchical structure, the hidden state of the estimation subject has a structure, in which a state transits according to a time change, and the intermediate hidden state also has the structure, in which the state transits according to the time change. The estimation device includes eight means. That is, an estimation subject hidden state predicting means for producing predictive information of the hidden state of the estimation subject at a present time t; an intermediate hidden state predicting means based on the state transition structure of the hidden state of the estimation subject, for producing the predictive information of the intermediate hidden state based on the state transition structure of the hidden state of the estimation subject at the present time t; an intermediate hidden state likelihood observing means for producing likelihood of the intermediate hidden state at the present time t; an intermediate hidden state estimating means for producing the estimative information of the intermediate hidden state at the present time t; an estimation subject hidden state likelihood observing means for producing the likelihood of the hidden state of the estimation subject at the present time t; estimation subject hidden state estimating means for producing the estimative information of the hidden state of the estimation subject at the present time t; an intermediate hidden state predicting means based on the state transition structure of the intermediate hidden state, for producing the predictive information of the intermediate hidden state based on the state transition structure of the intermediate hidden state at the present time t; and the mixing means for producing the predictive information of the intermediate hidden state at the present time t. The predictive information is produced by the estimation subject hidden state predicting means, using estimative information of the hidden state of the estimation subject at a previous time t−1, and a state transition structure of the hidden state of the estimation subject. The predictive information is produced by the intermediate hidden state predicting means based on the state transition structure of the hidden state of the estimation subject, using the predictive information of the hidden state of the estimation subject at the present time t, and the causal relationship between the hidden state of the estimation subject and the intermediate hidden state. Likelihood of the intermediate hidden state is produced by the intermediate hidden state likelihood observing means, using observed data about the observable state at the present time t, and the predictive information of the intermediate hidden state at the present time t, wherein the predictive information is produced by a mixing means to be hereinafter described. The estimative information is produced by the intermediate hidden state estimating means, using the predictive information of the intermediate hidden state at the present time t, and the likelihood of the intermediate hidden state at the present time t. The likelihood of the hidden state is produced by the estimation subject hidden state likelihood observing means, using the estimative information of the intermediate hidden state at the present time t, and the predictive information of the hidden state of the estimation subject at the present time t. The estimative information is produced by the estimation subject hidden state estimating means, using the predictive information of the hidden state of the estimation subject at the present time t, and the likelihood of the hidden state of the estimation subject at the present time t. The predictive information is produced by the intermediate hidden state predicting means based on the state transition structure of the intermediate hidden state, using the estimative information of the intermediate hidden state at the previous time t−1, and the state transition structure of the intermediate hidden state. The predictive information is produced by the mixing means as a result of mixing two pieces of the predictive information according to a predetermined mixing ratio. The two pieces of the predictive information include the predictive information of the intermediate hidden state based on the state transition structure of the hidden state of the estimation subject at the present time t, and the predictive information of the intermediate hidden state based on the state transition structure of the intermediate hidden state at the present time t.

BRIEF DESCRIPTION OF THE DRAWINGS

The invention, together with additional objectives, features and advantages thereof, will be best understood from the following description, the appended claims and the accompanying drawings in which:

FIG. 1 is a block diagram that indicates an overall configuration of an estimation device according to an embodiment of the present invention;

DETAILED DESCRIPTION OF THE INVENTION

Figure 2A:
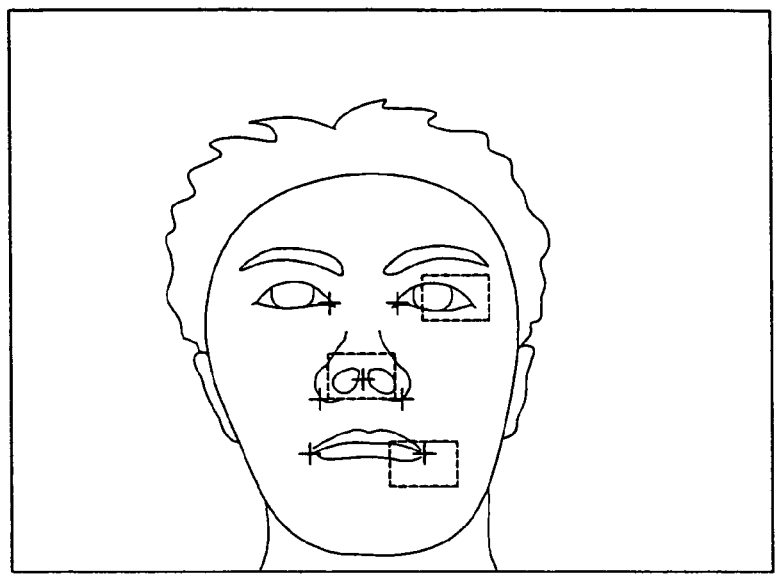
FIGS. 2A and 2B are illustrative diagrams that indicate a facial feature point and a planar facial model.

Embodiments of the present invention will be described below with reference to accompanying drawings.

FIG. 1 is a block diagram that shows an overall configuration of an image processor 1, to which the present invention is applied. The image processor 1, which is placed in a vehicle, processes time-series information on a driver's head posture through an image of the driver's head region to detect the driver's inattentiveness, snoozing and the like.

The image processor 1 is placed in front of an upper and/or lower part (e.g., inside a meter) of a driver's seat. As shown in FIG. 1, the image processor 1 includes a camera 2, a video capture board 3, an initial feature point extraction unit 4, a template production and memory unit 5, a measurement matrix production and memory unit 6, an estimation unit 8, and a head posture calculation unit 9. The camera 2 takes an image that includes the driver's head region. The video capture board 3 captures the image taken by the camera 2. When an initialization command is inputted into the initial feature point extraction unit 4, the initial feature point extraction unit 4 extracts coordinates (hereafter, referred to as facial feature points) $x\_\{n\}$ (n=1, 2, ... N) of a plurality of feature points (the number thereof: N) that represent driver's facial characteristics, from an input image $z_t$ (t indicates time) captured via the video capture board 3. For each of the facial feature points $x\_\{n\}$ extracted by the initial feature point extraction unit 4, the template production and memory unit 5 cuts off and stores a predetermined size of the image with the facial feature point $x\_\{n\}$ being its center, as a template $tp''$. The measurement matrix production and memory unit 6 produces and stores an initial facial model (a measurement matrix $C_a$), in which geometrical constraints imposed between the facial feature points $x\_\{n\}$ that have been extracted by the initial feature point extraction unit 4 are described. The estimation unit 8 estimates an affine parameter $a_t$ that indicates the driver's head posture by carrying out time-series Bayesian estimation based on the input image $z_t$, the template $tp''$, and the measurement matrix $C_a$. The head posture calculation unit 9 calculates the driver's head posture $\theta_x$, $\theta_y$, $\theta_z$ based on the affine parameter $a_t$ estimated by the estimation unit 8.

As shown in FIG. 2A, the initial feature point extraction unit 4 extracts an outer corner of the driver's eye, an inner corner of the driver's eye, an outer corner of the driver's mouth, and a nose (a nostril, a center of the nose, both left and right ends of the nose) and the like from the input image $z_t$ as the facial feature points. In the present embodiment, however, seven (=N) facial feature points, that is, both left and right outer corners of the driver's eye, both left and right inner corners of the driver's eye, both left and right outer corners of the driver's mouth, and the center of the nose are extracted. The initialization command is inputted into the initial feature point extraction unit 4 by means of the driver's operation, provided that the driver faces front, and that the image with no facial feature points being obstructed is taken with the camera 2.

Figure 2B:
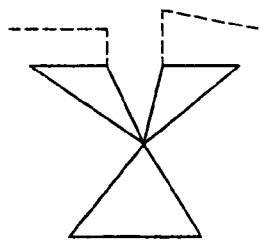
Figure 3:
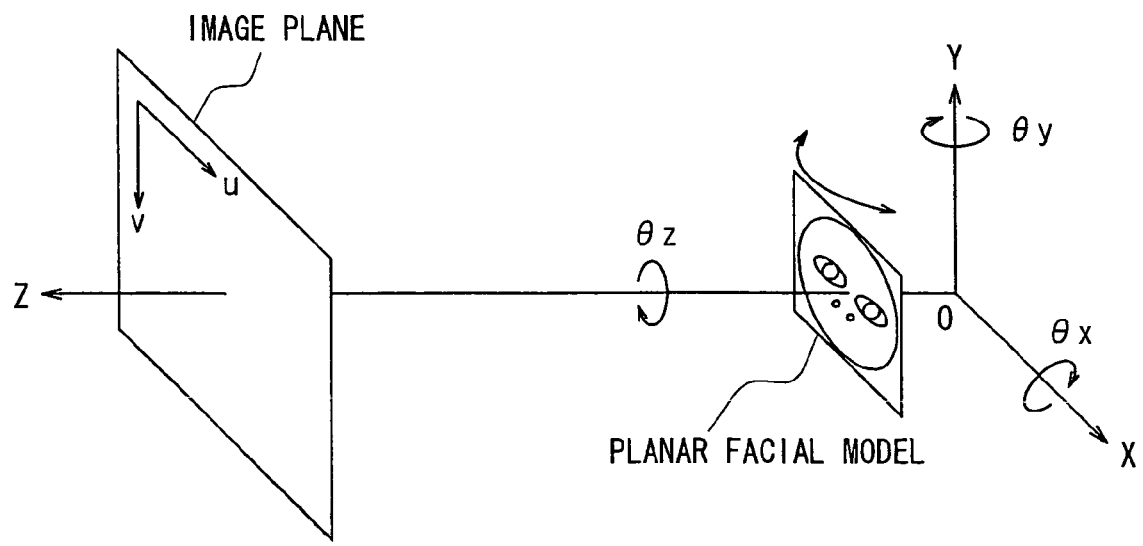
FIG. 3 is a schematic diagram that illustrates a coordinate system, which is applied to the estimation device.

As shown in FIG. 2B, the measurement matrix production and memory unit 6 produces the measurement matrix $C_a$ from a planar facial model, which presupposes that the facial feature points $x\_\{1\}$ to $x\_\{N\}$ (i.e., each vertex of a line diagram) are in one plane. The measurement matrix $C_a$ represents a positional relationship (a relative position and a relative distance) between the facial feature points $x\_\{n\}$. The planar facial model is presupposed for the purpose of simplification of a calculation. More specifically, as shown in FIG. 3, a horizontal coordinate axis and a vertical coordinate axis that indicate a coordinate in an image plane are defined as a u-axis and a v-axis respectively. As well, the horizontal coordinate axis, the vertical coordinate axis, and an optical axial direction (a depth direction) coordinate axis that indicate a coordinate in a three-dimensional space are defined as an x-axis, a y-axis, and a z-axis respectively. An nth facial feature point, which has been extracted by the initial feature point extraction unit 4, is expressed in a coordinate $(cu_n, cv_n)$ in the image plane, so that the measurement matrix $C_a$ is expressed in an equation (1).

$$c_a = \begin{pmatrix} c_1 \\ \vdots \\ c_N \end{pmatrix} \quad (1)$$

$$c_i = \begin{pmatrix} cu_i & cv_i & 1 & 0 & 0 & 0 \\ 0 & 0 & 0 & cu_i & cv_i & 1 \end{pmatrix}$$

The template production and memory unit 5 produces the template $tp''$. More specifically, the template $tp''$ is a trimmed part of the image within a white dotted frame indicated in FIG. 2A. Only the templates $tp''$ based on a left outer corner of the driver's mouth, the center of the nose, and a left outer corner of the driver's eye are indicated in FIG. 2A.

The affine parameter $a_t$, which is estimated by the estimation unit 8, is a vector that is obtained from vertical arrangement of elements $a_1$ to $a_6$ of a transformation matrix. This transformation matrix (from $(u, v)^T$ before the displacement, into $(u', v')^T$ after the displacement) is elicited when a coordinate transformation by means of rotation in the real world (a three-dimensional x y z space) is expressed in the coordinate transformation by means of an affine transformation in the image plane (a two-dimensional u v plane) as a projecting plane.

More specifically, a three-dimensional coordinate $(x, y, z)^T$ of a certain feature point is rotated around the x-axis by an angle $\theta_x$, around the y-axis by an angle $\theta_y$, and around the z-axis by an angle $\theta_z$. Given that the three-dimensional coordinate after this displacement (the rotation) is expressed in $(x', y', z')^T$, a relationship between the three-dimensional coordinate before the displacement and the three-dimensional coordinate after the displacement is expressed in an equation (2).

$$\begin{pmatrix} x' \\ y' \\ z' \end{pmatrix} = R_x R_y R_z \begin{pmatrix} x \\ y \\ z \end{pmatrix} \tag{2}$$

$$R_x = \begin{pmatrix} 1 & 0 & 0 \\ 0 & \cos\theta_x & -\sin\theta_x \\ 0 & \sin\theta_x & \cos\theta_x \end{pmatrix} \quad R_y = \begin{pmatrix} \cos\theta_y & 0 & \sin\theta_y \\ 0 & 1 & 0 \\ -\sin\theta_y & 0 & \cos\theta_y \end{pmatrix}$$

$$R_z = \begin{pmatrix} \cos\theta_z & -\sin\theta_z & 0 \\ \sin\theta_z & \cos\theta_x & 0 \\ 0 & 0 & 1 \end{pmatrix}$$

Two-dimensional coordinates as a result of projection of the three-dimensional coordinates $(x, y, z)^T$, $(x', y', z')^T$ onto the image plane, that is, coordinates of the certain feature points (before and after the displacement) in the image plane are expressed in $(u, v)^T$, $(u', v')^T$ respectively. Consequently, a relationship between the two-dimensional coordinate $(u, v)^T$ before the displacement and the two-dimensional coordinate $(u', v')^T$ after the displacement is expressed in an equation (3) by employing the affine parameter $a_t$.

$$\begin{pmatrix} u' \\ v' \end{pmatrix} = \begin{pmatrix} u & v & 1 & 0 & 0 & 0 \\ 0 & 0 & 0 & u & v & 1 \end{pmatrix} a_t \tag{3}$$

$$a_t = \begin{pmatrix} a_{1,t} \\ a_{2,t} \\ \vdots \\ a_{6,t} \end{pmatrix}$$

The head posture calculation unit 9 calculates three rotational angles $\theta_x$, $\theta_y$, $\theta_z$ of the driver's head region around three respective axes x, y, z as head posture information by using equations (4) to (6).

$$\theta_x = \frac{a_1 a_5 - a_2 a_4}{\sqrt{a_1^2 + a_4^2}} \tag{4}$$

$$\theta_y = \arccos\left(\sqrt{a_1^2 + a_4^2}\right) \tag{5}$$

$$\theta_z = \arctan\left(\frac{a_4}{a_1}\right) \tag{6}$$

Provided that the two-dimensional coordinate $(u', v')^T$ is an orthogonal projection of the three-dimensional coordinate $(x', y', z')^T$ onto the image plane, equations (7) to (10) below are elicited from the equations (2), (3). The above equations (4) to (6) are elicited from the equations (7) to (10).

$$a_1 = \cos\theta_z \cos\theta_y \tag{7}$$

$$a_2 = \cos\theta_z \sin\theta_y \sin\theta_x - \sin\theta_z \cos\theta_x \tag{8}$$

$$a_3 = \sin\theta_z \cos\theta_y \tag{9}$$

$$a_4 = \sin\theta_z \sin\theta_y \sin\theta_x - \cos\theta_z \cos\theta_x \tag{10}$$

Given the affine parameter $a_t$ that represents the driver's head posture at time t, positions $P_t$ ($=C_a a_t$) of all the facial feature points at the time t can be estimated from an initial position (i.e., the measurement matrix $C_a$) of the planar facial model.

The affine parameter $a_t$ at the time t can be obtained if at least three pairs of corresponding relationships between initial (t=0) positions $x\_\{1\}(0)$ to $x\_\{N\}(0)$ of the facial feature points $x\_\{1\}$ to $x\_\{N\}$, and positions $x_t\_\{1\}$ to $x_t\_\{N\}$ of the facial feature points at the time t are identified. Conversely, given the affine parameter $a_t$, a position of a hidden facial feature point at the time t that is not caught in the image by the camera 2 can be estimated from the affine parameter $a_t$ that has been obtained.

Figure 4:
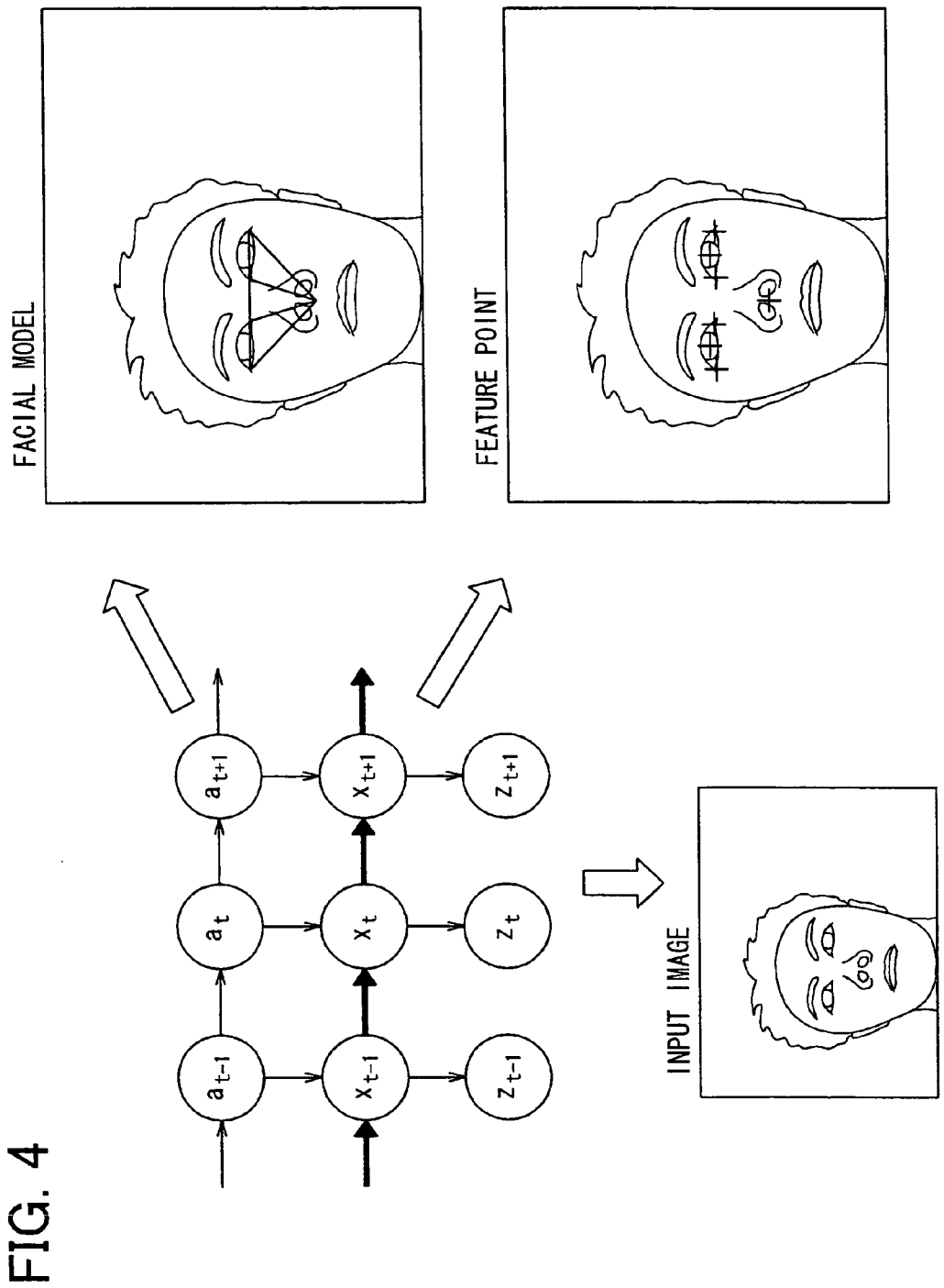
FIG. 4 is an illustrative diagram that indicates a state space model that is dealt with by an estimation unit.

With reference to FIG. 4, a processing at the estimation unit 8, which is an essential part of the present invention, will be described in detail below. FIG. 4 is an illustrative diagram that indicates a state space model that is processed at the estimation unit 8. As shown in FIG. 4, the estimation unit 8 includes a higher layer and a lower layer. At the higher layer, the affine parameter $a_t$, which represents a posture of a facial model at the time t, is elicited as a hidden state. At the lower layer (only one of N facial feature points (N layers) is shown in FIG. 4), positions $x_t(=(x_t\_\{1\}, x_t\_\{2\}, \ldots, x_t\_\{N\})^T)$ of facial feature points at the time t are elicited as the hidden state. The hidden states $a_t$ and $x_t$ are estimated from input image series $z_{1:t}$, which have been inputted into the estimation unit 8 by the time-series Bayesian estimation until the time t.

Figure 5:
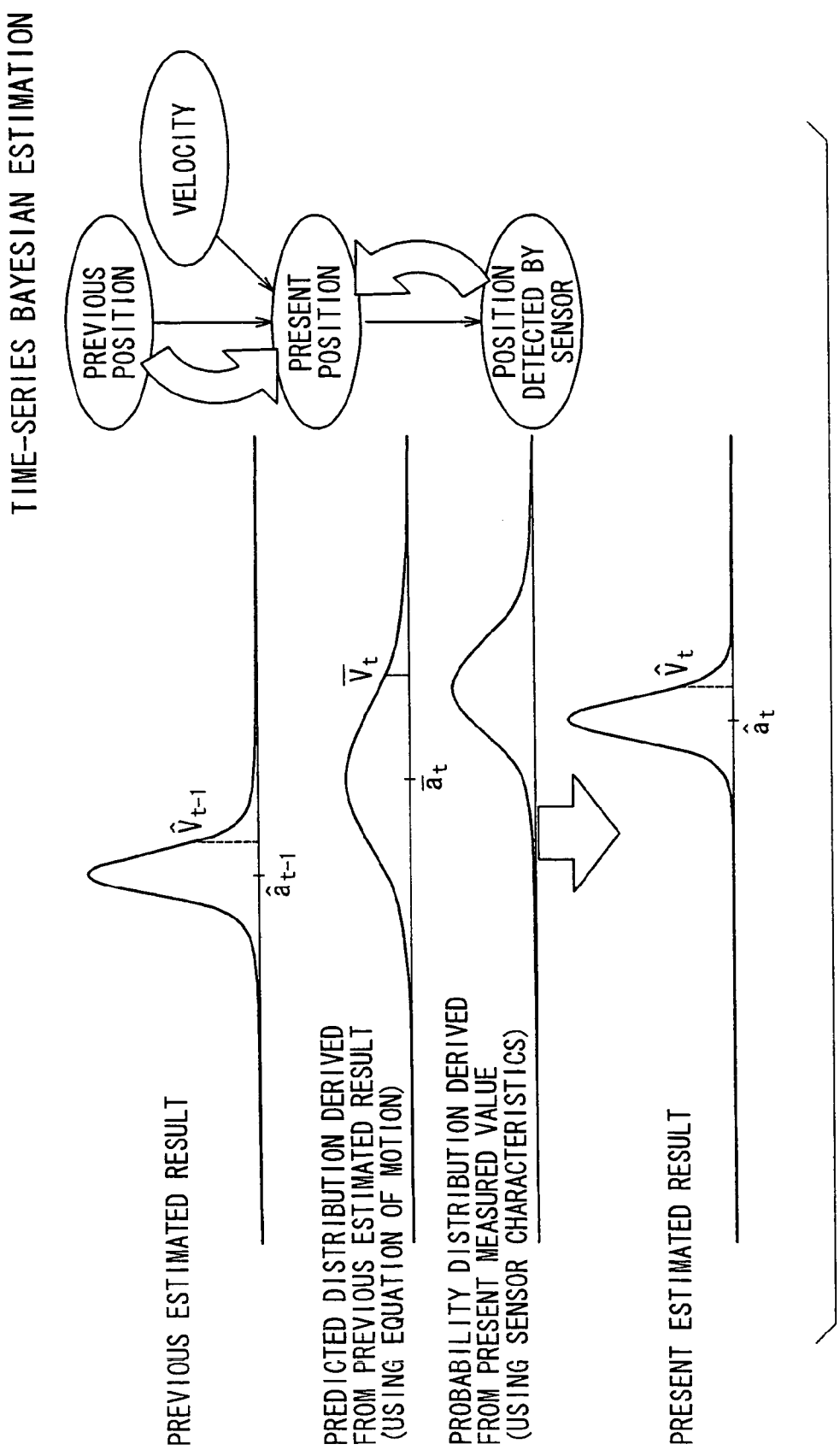
FIG. 5 is an illustrative diagram that indicates a general operation of time-series Bayesian estimation.

As shown in FIG. 5, the time-series Bayesian estimation treats a state variable as probability distribution. Predicted distribution at the time t is derived from a result of the estimation (estimation distribution) in the hidden state at time t−1. Likelihood, which is the hidden state to be detected, is derived from observed data at the time t. The result of the estimation (the estimation distribution) at the time t is obtained based on the predicted distribution and the likelihood. By repeating the above procedure, the hidden state is sequentially estimated.

That is, at the estimation unit 8, posterior probability distribution (the estimation distribution) $p(a_t|z_{1:t})$, which estimates the affine parameter (the hidden state of the driver's head posture) $a_t$ based on the input image series (the observed data) $z_{1:t}$, is obtained. This processing is expressed in equations (11), (12) below.

$$p(a_t|z_{1:t}) \propto p(a_t|z_{1:t-1}) p(z_t|a_t, z_{1:t-1}) \tag{11}$$

$$p(z_t|a_t, z_{1:t-1}) = \int p(z_t|x^{(t)}) p(x^{(t)}|a_t, z_{1:t-1}) dx^{(t)} \tag{12}$$

In the above equations, $p(a_t|z_{1:t-1})$ expresses prior probability distribution (the predicted distribution) of the affine parameter $a_t$. $p(x_t|a_t, z_{1:t-1})$ expresses the prior probability distribution (the predicted distribution) of the positions $x_t$ of the facial feature points. $p(z_t|a_t, z_{1:t-1})$ and $p(z_t|x_t)$ express the likelihood.

The lower layer estimates a right side of the equation (12) by means of a particle filter. The higher layer estimates the right side of the equation (11) by means of a Kalman filter.

In addition, given that μ represents an average, and that Σ (a standard deviation σ) represents a variance, probability distribution of a certain parameter f is expressed in an equation (13), when the probability distribution conforms to Gaussian distribution (normal distribution). Therefore, in order to calculate the probability distribution of a parameter, it is sufficient to derive its average μ and its variance Σ.

$$N_D(f \mid \mu, \Sigma) = (2\pi)^{\frac{-D}{2}} |\Sigma|^{\frac{-1}{2}} \exp\{(f-\mu)^T \Sigma^{-1}(f-\mu)\} \quad (13)$$

Figure 6:
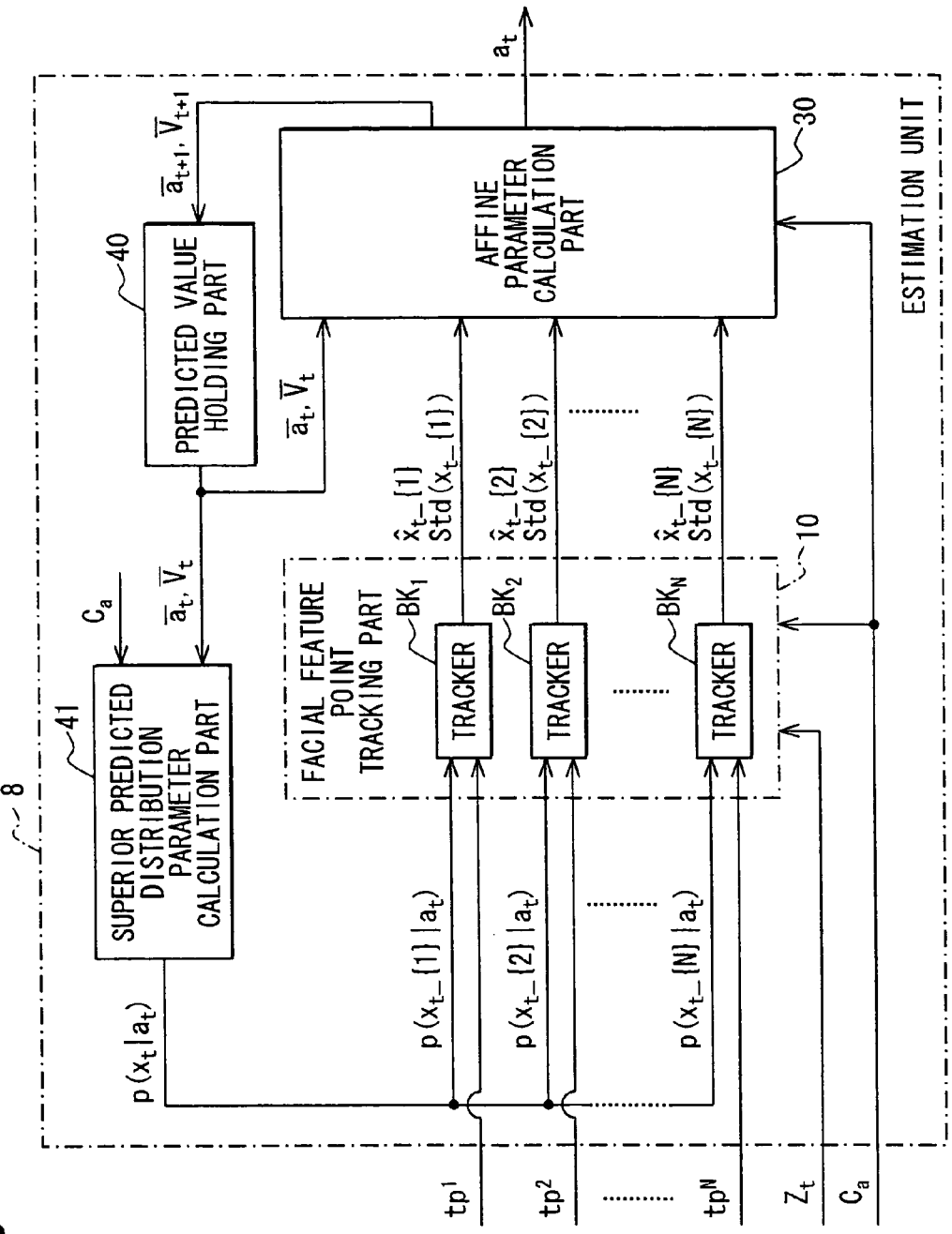
FIG. 6 is a block diagram that indicates a configuration of the estimation unit.

FIG. 6 is a block diagram that indicates a configuration of the estimation unit 8.

As shown in FIG. 6, the estimation unit 8 includes a facial feature point tracking part 10, an affine parameter calculation part 30, a predicted value holding part 40, and a superior predicted distribution parameter calculation part 41. The facial feature point tracking part 10 includes trackers $BK_n$ (the number thereof: N), each of which corresponds to the facial feature point $x\_\{n\}$ (n=1-N) respectively. Each tracker $BK_n$ tracks the corresponding facial feature point $x\_\{n\}$ (n=1-N). Then, the tracker $BK_n$ produces feature point estimation distribution parameters (the average and the standard deviation). Through a Gaussian approximation, the feature point estimation distribution parameters define the probability distribution that approximates the probability distribution, which estimates the positions $x_t\_\{n\}$ of the facial feature points $x\_\{n\}$ at the time t. Based on the feature point estimation distribution parameters that have been calculated by each tracker $BK_n$, the affine parameter calculation part 30 calculates the affine parameter $a_t$, and a predicted value $a_{t+1}$ and a variance $V_{t+1}$ of the affine parameter (hereafter, referred to as the predicted value etc.) by means of the Kalman filter. The predicted value holding part 40 holds the predicted value etc. of the affine parameter, which has been calculated by the affine parameter calculation part 30. The superior predicted distribution parameter calculation part 41 calculates superior predicted distribution parameters (the average and the variance), and provides the superior predicted distribution parameters to each tracker $BK_n$. The superior predicted distribution parameters define probability distribution $p(x_t | a_t)$. The probability distribution $p(x_t | a_t)$ predicts the positions $x_t(=(x_t\_\{1\}, x_t\_\{2\}, \ldots, x_t\_\{N\})^T)$ of the facial feature points at the time t based on a calculation of this predicted value etc. of the affine parameter at the time t−1. The predicted value etc. of the affine parameter at the time t−1 are held at the predicted value holding part 40.

Therefore, the affine parameter calculation part 30 corresponds to the higher layer, and each of the trackers $BK_n$, which constitute the facial feature point tracking part 10, corresponds to the lower layer.

Additionally, the Kalman filter, which is employed in the affine parameter calculation part 30, presupposes a relation (14) as a state transition process of the affine parameter $a_t$. The relation (14) expresses an assumption that a motion model of the affine parameter $a_t$ is linear uniform motion, and that system noise conforms to the Gaussian distribution, in which linear transformation is performed on the variance of standardized normal distribution (μ=0, Σ=1 in the Gaussian distribution). The Kalman filter also presupposes a linear relation (15) as a measurement process of an expectation vector $f_t$ of the positions $x_t$ (which is estimated at the lower layer) of the facial feature points. The presupposition of this measurements model is due to the fact that an application of the Kalman filter requires that a system should be expressed linearly, and that the probability distribution of a state and the likelihood should be expressed as the Gaussian distribution. The expectation vector $f_t$ (which is approximated by the Gaussian distribution) of the positions of the facial feature points corresponds to measurement information when the affine parameter $a_t$ is estimated.

$$a_{t+1} = A_a a_t + B_a w_{a,t} \quad (14)$$

$$f_t = C_a a_t + D_a v_{a,t} \quad (15)$$

$A_a$ is a matrix that expresses the motion model (the linear uniform motion). $B_a$ is a matrix that expresses size (a degree of deviation from a prediction) of the variance of the system noise. $C_a$ is the measurement matrix (a geometric relationship between the coordinates of the facial feature points and the affine parameter). $D_a$ is a matrix that represents the size (size of the noise that affects an observed value) of the variance of observed noise. $w_{a,t}$ and $v_{a,t}$ are vectors, which express the noise that conforms to the standardized normal distribution.

Figure 7:
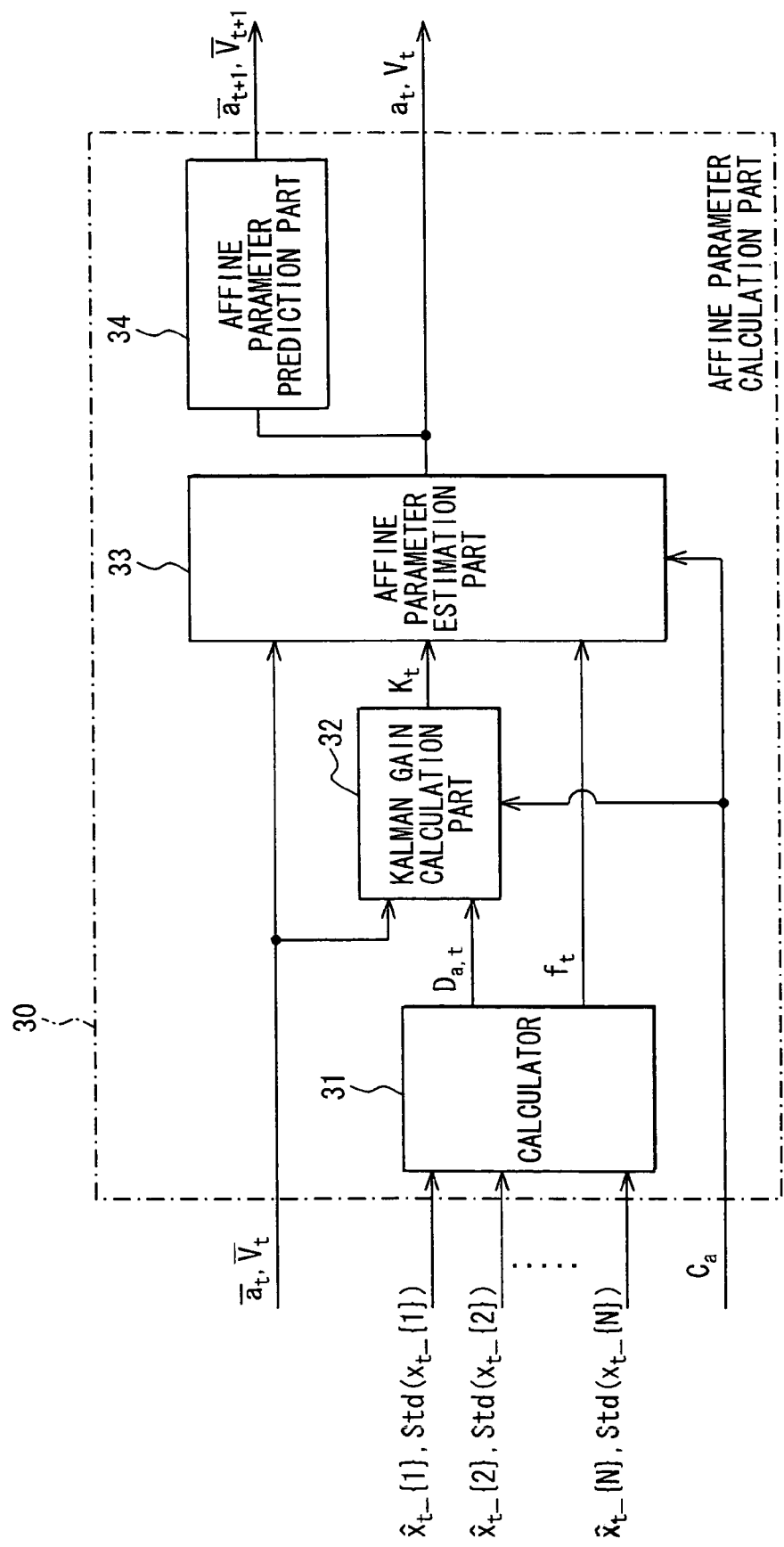
FIG. 7 is a block diagram that indicates a configuration of an affine parameter calculation part.

FIG. 7 is a block diagram that indicates a configuration of the affine parameter calculation part 30.

As shown in FIG. 7, the affine parameter calculation part 30 includes a calculator 31, a Kalman gain calculation part 32, an affine parameter estimation part 33, and an affine parameter prediction part 34. The calculator 31 produces the expectation vector $f_t$ of the positions of the facial feature points, and a noise matrix $D_{a,t}$. The expectation vector $f_t$ is an array of expected values (the averages) of the probability distribution of the positions $(x_t\_\{1\}$ to $x_t\_\{N\})$ of the corresponding facial feature points at the time t. The expectation vector $f_t$ is produced based on the feature point estimation distribution parameters (the average and the standard deviation), which are provided correspondingly to the facial feature points $(x\_\{1\}$ to $x\_\{N\})$ by the facial feature point tracking part 10. The noise matrix $D_{a,t}$ is an array of the standard deviations. The Kalman gain calculation part 32 calculates a Kalman gain $K_t$. The Kalman gain $K_t$ is calculated based on the predicted value etc. (hereafter, referred to as an affine parameter predicted value etc.), the noise matrix $D_{a,t}$, and the measurement matrix $C_a$. The affine parameter predicted value etc. are provided through the predicted value holding part 40, and are further based on an estimated value of the affine parameter at the time t−1. The noise matrix $D_{a,t}$ has been produced at the calculator 31. The measurement matrix $C_a$ has been stored at the measurement matrix production and memory unit 6. The affine parameter estimation part 33 estimates estimated values (hereafter, referred to as an affine parameter estimated value etc.) $a_t$, $V_t$ of the affine parameter and its variance, respectively. The affine parameter estimated value etc. $a_t$, $V_t$ express the posterior probability distribution. The affine parameter estimated value etc. $a_t$, $V_t$ are estimated based on the Kalman gain $K_t$, the affine parameter predicted value etc., the expectation vector $f_t$ of the positions of the facial feature points, and the measurement matrix $C_a$. The affine parameter prediction part 34 calculates the affine parameter predicted value etc. (which express the prior probability distribution) at the following time t+1, based on the affine parameter estimated value etc. $a_t$, $V_t$ that have been estimated at the affine parameter estimation part 33.

The expectation vector $f_t$ of the positions of the facial feature points and the noise matrix $D_{a,t}$ are produced by the calculator 31. The expectation vector $f_t$ is expressed in an equation (16), and the noise matrix $D_{a,t}$ is expressed in an equation (17). The 'diag' in the equation (17) expresses a diagonal matrix that has each element of the matrix as a diagonal element.

$$f_t = (\hat{x}\_\{1\}(t), \hat{x}\_\{2\}(t), \cdots, \hat{x}\_\{N\}(t))^T \quad (16)$$

$$D_{a,t} = diag(Std(x\_\{1\}(t)), Std(x\_\{2\}(t)), \cdots, Std(x\_\{N\}(t)))^T \quad (17)$$

The Kalman gain calculation part 32 calculates the Kalman gain $K_t$ by using an equation (18). The affine parameter estimation part 33 calculates the affine parameter estimated value $a_t$ by using an equation (19), and the estimated value $V_t$ of the variance of the affine parameter by using an equation (20).

$$K_t = \overline{V}_t C_a^T (D_{a,t} D_{a,t}^T + C_a \overline{V}_t C_a^T)^{-1} \quad (18)$$

$$\hat{a}_t = \overline{a}_t + K_t(f_t - C_a \overline{a}_t) \quad (19)$$

$$\hat{V}_t = (I - K_t C_a) \overline{V}_t \quad (20)$$

The affine parameter prediction part 34 calculates the affine parameter predicted value by using an equation (21), and the predicted value of the variance of the affine parameter by using an equation (22). In the equations (21), (22), the parameters $a_t$, $V_t$ with 'hats' express the estimated values, and the parameters $a_t$, $V_t$ with 'bars' express the predicted values. Hereafter, this arrangement will apply to parameters that express the estimated and predicted values.

$$\overline{a}_{t+1} = A_a \hat{a}_t \quad (21)$$

$$\overline{V}_{t+1} = B_a B_a^T + A_a \hat{V}_t A_a^T \quad (22)$$

$$A_a = \begin{pmatrix} 2 & -1 & \cdots & 0 & 0 \\ 1 & 0 & \cdots & 0 & 0 \\ \vdots & \vdots & \ddots & \vdots & \vdots \\ 0 & 0 & \cdots & 2 & -1 \\ 0 & 0 & \cdots & 1 & 0 \end{pmatrix}$$

$$B_a = \begin{pmatrix} b_1 & 0 & \cdots & 0 & 0 \\ 0 & 0 & \cdots & 0 & 0 \\ \vdots & \vdots & \ddots & \vdots & \vdots \\ 0 & 0 & \cdots & b_6 & 0 \\ 0 & 0 & \cdots & 0 & 0 \end{pmatrix} \quad a_t = \begin{pmatrix} a_{1,t} \\ a_{1,t-1} \\ \vdots \\ a_{6,t} \\ a_{6,t-1} \end{pmatrix}$$

By using the equation (13), the posterior probability distribution $p(a_t|z_{1:t})$ of the affine parameter $a_t$ is expressed in an equation (23), and the prior probability distribution $p(a_{t+1}|z_{1:t})$ of the affine parameter $a_t$ is expressed in an equation (24).

$$p(a_t | z_{1:t}) = N(a_t | \hat{a}_t, \hat{V}_t) \quad (23)$$

$$p(a_{t+1} | z_{1:t}) = N(a_{t+1} | \overline{a}_{t+1}, \overline{V}_{t+1}) \quad (24)$$

The above equation (19) that calculates the estimated value of the affine parameter $a_t$ expresses the following relationship between both sides of the equation. That is, an addition of the predicted value $a_t$ to a correction value, which is obtained as a result of multiplying by the Kalman gain $K_t$ a subtraction of the predicted value ($C_a a_t$) from an observed value ($f_t$) of the positions $x_t$ of the facial feature points, equals the estimated value $a_t$.

The Kalman gain $K_t$ can be seen as controlling a mixing ratio between the observed and predicted values of the positions $x_t$ of the facial feature points. The larger the variance of the predicted value becomes (or the smaller the variance of the observed value becomes), the larger the Kalman gain $K_t$ becomes. Conversely, the smaller the variance of the predicted value becomes (or the larger the variance of the observed value becomes), the smaller the Kalman gain $K_t$ becomes.

The large variance of the predicted or observed value means that the predicted or observed value has relatively poor reliability (i.e., the predicted or observed value is subject to a deviation from a presupposed model; high noise is likely to affect the observed value). The small variance of the predicted or observed value means that the predicted or observed value has relatively high reliability (i.e., the predicted or observed value is likely to approximate a presupposed model; the noise is less likely to affect the observed value).

That is, when the observed value has higher reliability than the predicted value, the Kalman gain $K_t$ becomes relatively large, and the affine parameter calculation part 30 produces the estimated value that places an emphasis on the observed value. Conversely, when the predicted value has higher reliability than the observed value, the Kalman gain $K_t$ becomes relatively small, and the affine parameter calculation part 30 produces the estimated value that places an emphasis on the predicted value.

The superior predicted distribution parameter calculation part 41 calculates the superior predicted distribution parameters (the average $\mu$ and the variance $\Sigma$) by using an equation (25) below, since superior predicted distribution $p(x_t|a_t)$ of the position $x_t$ of the facial feature point can be obtained from the equation (25).

$$p(x(t)|a_t) = N(f_t | C_a a_t, C_a V_t C_a^T) \quad (25)$$

Next, operations of the trackers $BK_n$, which constitute the facial feature point tracking part 10, will be described below.

The tracker $BK_n$ tracks one facial feature point $x_n$ by means of the particle filter. An overview of an operation of the particle filter will be illustrated below with a schematic diagram shown in FIG. 8.

Figure 8:
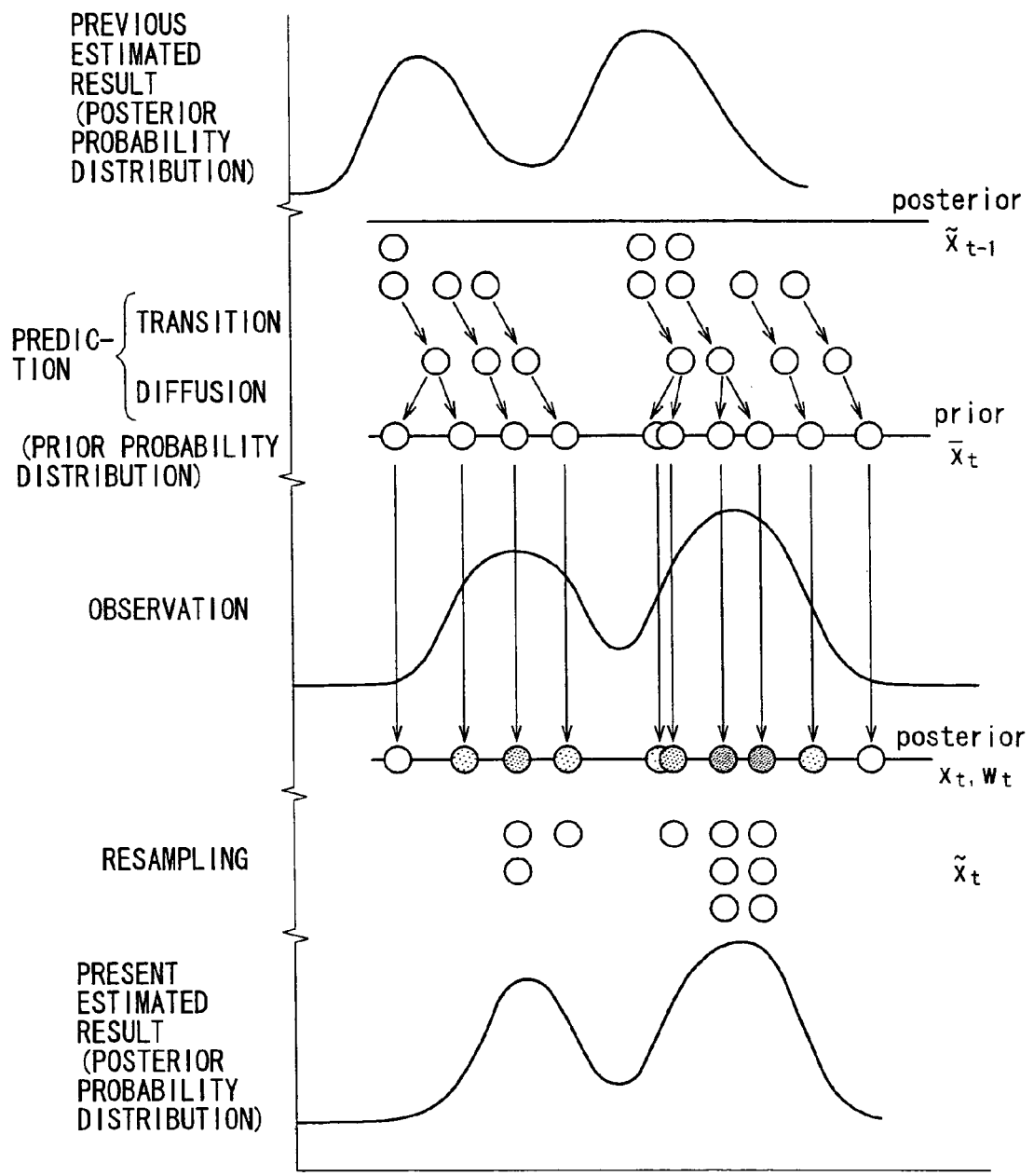
FIG. 8 is an illustrative diagram that indicates a general operation of a particle filter.

As shown in FIG. 8, in the particle filter, an occurrence (the coordinate in the image plane) of a state (the position of the facial feature point) of an object that is to be estimated is expressed in a particle. Distribution of the particles is derived in a manner of a time series by carrying out three processes (a prediction, an observation, and a resampling) repeatedly. Unlike the Kalman filter, the particle filter is able to deal with not only the Gaussian distribution but arbitrary probability distribution.

In a prediction process, a state (here, a position in the image plane) of each particle in state space (here, in the image plane) is made to transit in view of motion of the object to be estimated. Then, the particles are diffused at random in the light of the noise that affects the motion of the object to be estimated, so that a particle group are arranged in positions in which the objects to be estimated are likely to exist. Accordingly, the probability distribution that predicts the state of the object to be estimated is expressed discretely and approximately in the positions and the number of the particle groups.

In an observation process, a weight to be put on the particle is calculated according to the likelihood (here, a normalized correlative value with the template that represents the facial feature point) that the state of each particle is the state of the object to be estimated. As a result, the probability distribution of the state of the object to be estimated is expressed in the particles having the corresponding weights.

In a resampling process, the particle with a light weight is eliminated, while the particle having a heavy weight is replaced with a plurality of the particles (that have been multiplied) having no weight. Consequently, an expression of the probability distribution of the state of the object to be estimated is randomly transformed, that is to say, the probability distribution is not expressed in the particles having the weights but in the particles having no weight.

The probability distribution (expressed in the particles) of the state of the object to be estimated is derived in the manner of the time series by going through the above prediction process again by use of these resampled particles (particles produced in the resampling process).

Figure 9:
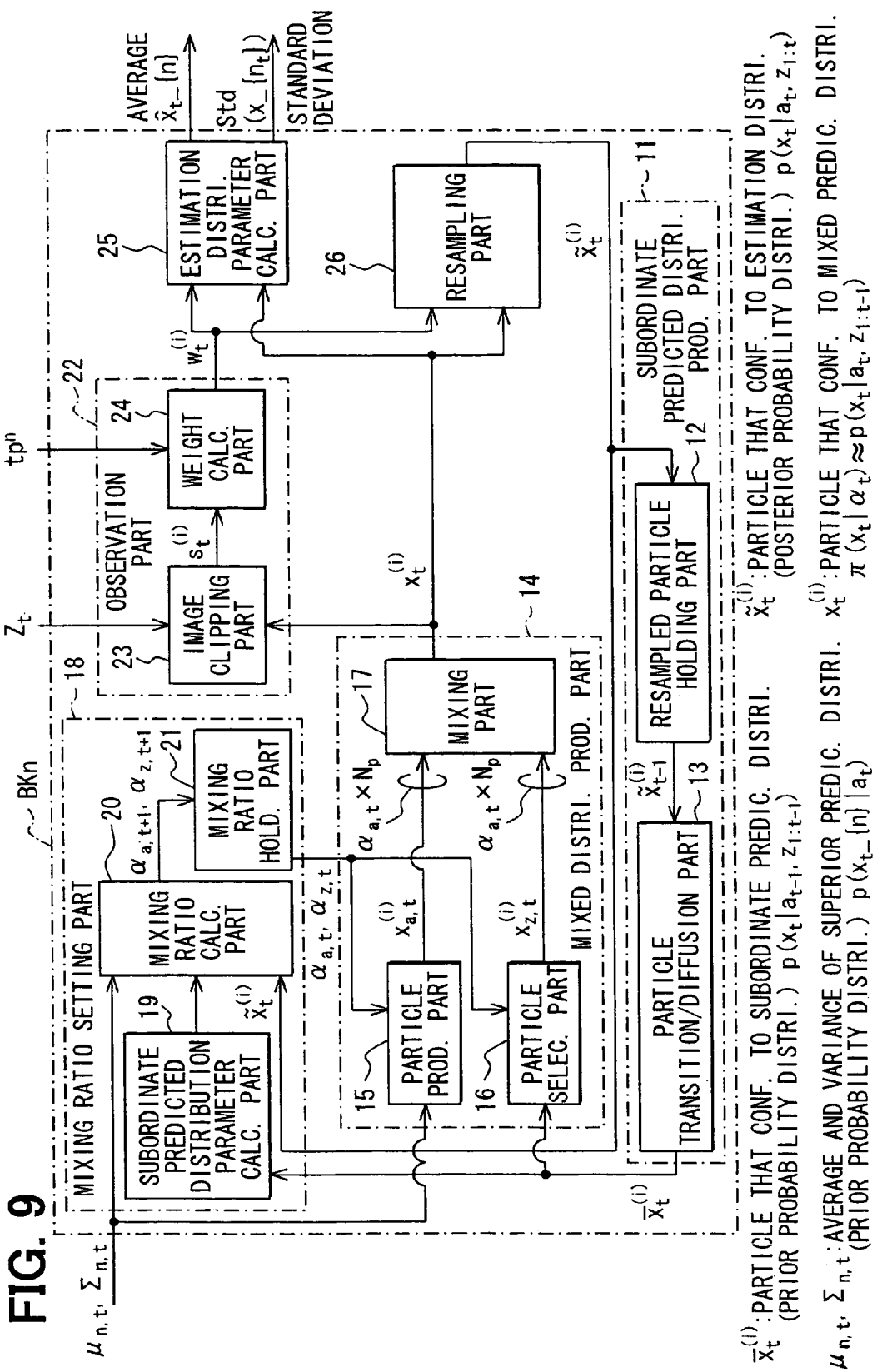
FIG. 9 is a block diagram that indicates a configuration of a tracker.

FIG. 9 is a block diagram that indicates a configuration of the tracker $BK_n$, which tracks the facial feature point $x\_\{n\}$ by means of the particle filter.

As shown in FIG. 9, the tracker $BK_n$ includes a subordinate predicted distribution production part 11 and a mixed distribution production part 14. The subordinate predicted distribution production part 11 produces the particle that conforms to the probability distribution (hereafter, referred to as subordinate predicted distribution), which predicts the facial feature point based on a resampled value (that will be described later in detail) of the particle. The mixed distribution production part 14 produces the particle that conforms to mixed distribution $\pi(x_t|\alpha_t)$, which is obtained as a result of mixing the superior predicted distribution with the subordinate predicted distribution in predetermined mixing ratios $\alpha_{a,t}$, $\alpha_{z,t}$ ($0 \leq \alpha_{a,t} \leq 1$, $0 \leq \alpha_{z,t} \leq 1$, $\alpha_{a,t}+\alpha_{z,t}=1$). The above particle is produced based on the superior predicted distribution parameters (i.e., the average $\mu$ and the variance $\Sigma$ of the coordinate of the facial feature point) (that have been produced at the superior predicted distribution parameter calculation part 41) in relation to the facial feature point, and on the particle that has been produced at the subordinate predicted distribution production part 11.

Also, as shown in FIG. 9, the tracker $BK_n$ further includes an observation part 22, an estimation distribution parameter calculation part 25, a resampling part 26, and a mixing ratio setting part 18. The observation part 22 calculates the weight of the particle, which has been produced at the mixed distribution production part 14, based on the observed data $Z_t$ and the template $tp^n$. The estimation distribution parameter calculation part 25 calculates the feature point estimation distribution parameters (the average and the standard deviation), which define the probability distribution (hereafter, referred to as the estimation distribution) that estimates the position of the facial feature point. The above feature point estimation distribution parameters are calculated based on a position of the particle that has been produced at the mixed distribution production part 14, and on the weight that has been calculated at the observation part 22. The resampling part 26 resamples the particle that has been produced at the mixed distribution production part 14 according to the weight that has been calculated at the observation part 22. The mixing ratio setting part 18 produces the mixing ratios $\alpha_{a,t}$, $\alpha_{z,t}$ that are to be used for following production of the particle at the mixed distribution production part 14. The above mixing ratios are produced based on the particle that has been resampled at the resampling part 26, the superior predicted distribution parameters that have been calculated at the superior predicted distribution parameter calculation part 41, and the particle that has been produced at the subordinate predicted distribution production part 11.

The subordinate predicted distribution production part 11 includes a resampled particle holding part 12 and a particle transition/diffusion part 13. The resampled particle holding part 12 stores the particles (the number thereof: Np) that have been resampled at the resampling part 26. The particle transition/diffusion part 13 produces the particle that conforms to the subordinate predicted distribution, by transiting/diffusing the particle (which is stored at the resampled particle holding part 12) that conforms to a previous result of the estimation (the estimation distribution).

Additionally, at the particle transition/diffusion part 13, an equation (26) is applied to each particle to produce the particle that conforms to the subordinate predicted distribution.

$$\bar{x}_t^{(i)} = A_f \tilde{x}_{t-1}^{(i)} + B_f w_{f,t} \qquad (26)$$

$$A_f = \begin{pmatrix} 2 & -1 & 0 & 0 \\ 1 & 0 & 0 & 0 \\ 0 & 0 & 2 & -1 \\ 0 & 0 & 1 & 0 \end{pmatrix} \quad B_f = \begin{pmatrix} b_u & 0 & 0 & 0 \\ 0 & 0 & 0 & 0 \\ 0 & 0 & b_v & 0 \\ 0 & 0 & 0 & 0 \end{pmatrix} \quad x_t^{(i)} = \begin{pmatrix} u_t \\ u_{t-1} \\ v_t \\ v_{t-1} \end{pmatrix}$$

Figure 10:
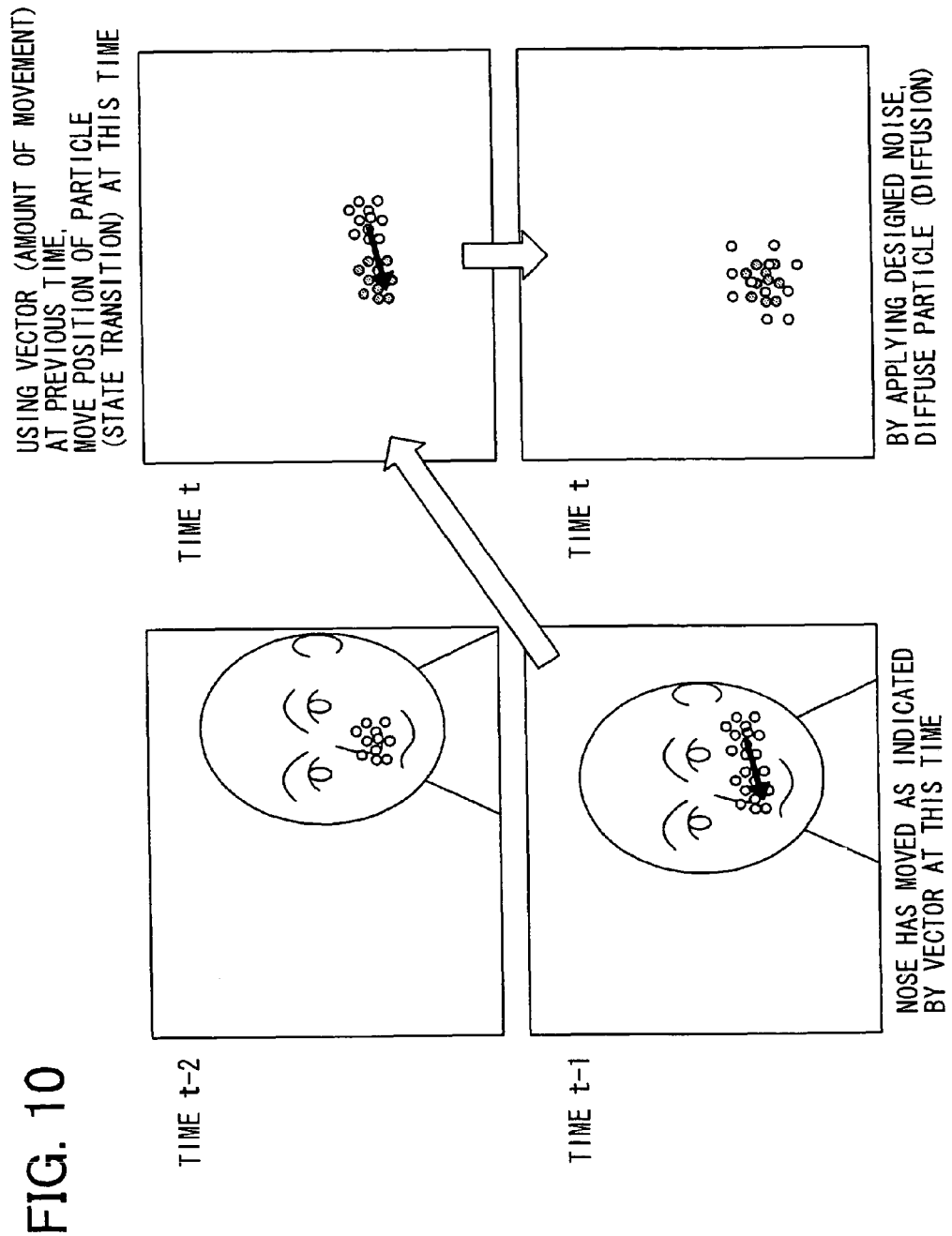
FIG. 10 is an illustrative diagram that indicates a tangible example of an operation (transition/diffusion) of the particle filter.

$\bar{x}_t^{(i)}$: a particle that conforms to the subordinate predicted distribution $\tilde{x}_{t-1}^{(i)}$: a (resampled) particle that conforms to previous estimation distribution $W_{f,t}$: noise that conforms to the standardized normal distribution That is to say, a matrix $A_f$ expresses a presupposition of the linear uniform motion as dynamics of the facial feature point. As shown in FIG. 10, the matrix $A_f$ corresponds to transiting (shifting) a position of the particle group by a distance of movement of the facial feature point between an estimated position two times before (at time t−2) and the estimated position at a previous time (at the time t−1). A matrix $B_f$ expresses addition of random (white Gaussian) noise to the distance of the movement, and corresponds to diffusing the position of the particle group.

The mixed distribution production part 14 includes a particle production part 15, a particle selection part 16, and a mixing part 17. The particle production part 15 produces the particles (the number thereof: $\alpha_{a,t} \times Np$) that conform to the superior predicted distribution $p(x_t|a_t)$, based on the superior predicted distribution parameters $\mu_{n,t}$, $\sigma_{n,t}$. The particle selection part 16 selects the particles (the number thereof: $\alpha_{z,t} \times Np$) randomly from the particles (the number thereof: Np) that conform to the subordinate predicted distribution $p(x_t|a_{t-1}, z_{1:t-1})$ that has been produced at the subordinate predicted distribution production part 11. The mixing part 17 mixes the particles that have been produced at the particle production part 15 and those selected at the particle selection part 16. Then, the mixing part 17 produces the particles (the number thereof: Np) that conform to the mixed distribution $\pi(x_t|\alpha_t) \cong p(x_t|a_t, z_{1:t-1})$ of the superior and subordinate predicted distributions.

More specifically, a widely known random number generator, which generates random sampling numbers as a result of an input of the average $\mu_{n,t}$ and the variance $\Sigma_{n,t}$ (or the standard deviation $\sigma_{n,t}$) into the particle production part 15, can be employed for the particle production part 15. The above random sampling numbers conform to the normal distribution, which is identified by the average and the variance (or the standard deviation).

The observation part 22 includes an image clipping part 23 and a weight calculation part 24. The image clipping part 23 clips an image (hereafter, referred to as a clipped image) $S_t$ of the same size as the template $tp^n$ from the input image $z_t$ with the position of the particle being a center of the clipped image $S_t$. The clipped image $S_t$ is clipped from the input image, corresponding to each particle that has been produced at the mixed distribution production part 14. The weight calculation part 24 calculates the normalized correlative value that expresses similarity between the template $tp''$ and each clipped image $S_t$, which has been clipped by the image clipping part 23. According to the normalized correlative value, the weight calculation part 24 produces the weight $w_t$ of each particle.

At the weight calculation part 24, the weight $w_t$ of the particle is determined by using an equation (27). Then, the probability distribution that is derived from the weight and the position of the particle is assigned as estimation distribution (the posterior probability distribution) $p(x_t|a_t,z_{1:t})$ at this time (at the time t).

$$w_t^{(i)} \propto \exp\left(\frac{-(r(tp^n, s_t^{(i)}) - 1.0)^2}{2D_f^2}\right) \quad (27)$$

Figure 11:
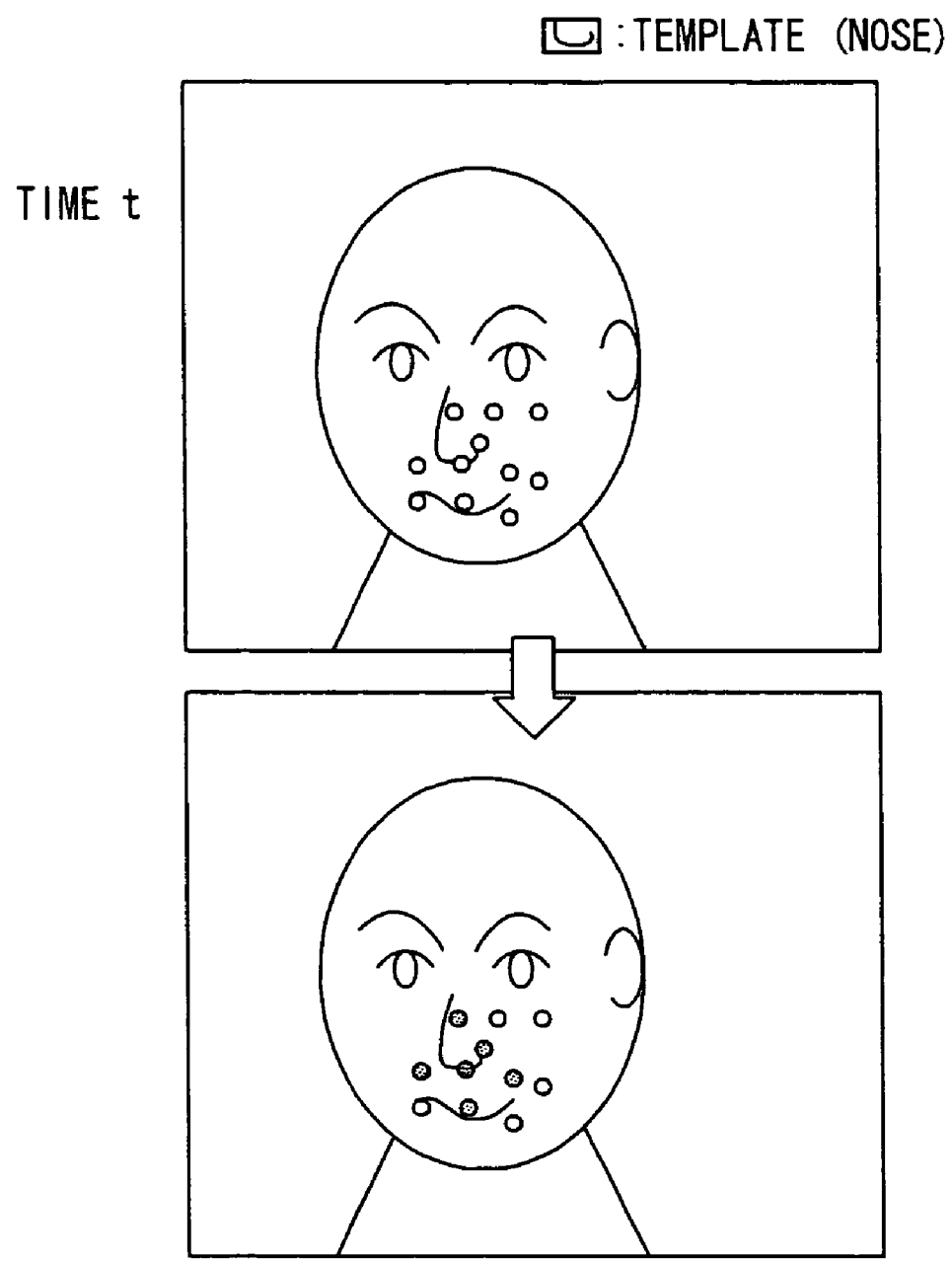
FIG. 11 is an illustrative diagram that indicates the tangible example of the operation (observation) of the particle filter.

$r(tp'', s_t^{(i)})$: the normalized correlative value between a standardized template $tp''$ and the image $s_t^{(i)}$ $D_f$: a parameter that determines an extent of influence of a change in the normalized correlative value upon the weight of the particle The weight $w_t$ of the particle is indicated with a different shade in FIGS. 8 and 11.

Since a true observation process (i.e., $p(z_t|x_t)$ in the equation (12)) is unknown, a calculation of the weight $w_t$ of the particle involves a model of some sort. In the present embodiment, the weight $w_t$ of the particle is determined by employing the normalized correlative value between the template $tp''$ and the clipped image $S_t$ as the above model. Consequently, the calculation of the weight $w_t$ of the particle at the weight calculation part 24 results in a covert definition of the observation process.

In view of the weight $w_t$ of the particle, the estimation distribution parameter calculation part 25 calculates the average (an expected value) and the standard deviation (or the variance) of the position of the particle, which has been produced at the mixed distribution production part 14. The probability distribution is expressed in the particle having the weight, and the Gaussian distribution is expressed in the average and the standard deviation of the probability distribution. Expressing this probability distribution in the Gaussian distribution means that the probability distribution having non-Gaussianity is approximated by the probability distribution having Gaussianity. Then, at the affine parameter calculation part 30, as mentioned above, the likelihood of the facial feature point is obtained by using the Gaussian distribution, which is expressed in the average and the standard deviation. The above likelihood is employed in estimating the affine parameter.

At the resampling part 26, the particle that expresses the probability distribution in its position and weight is randomly transformed into the particle that expresses the probability distribution in its position and number. More specifically, in proportion to the weight of the particle, the particle having the light weight is eliminated, whereas the particle having the heavy weight is multiplied.

Figure 12:
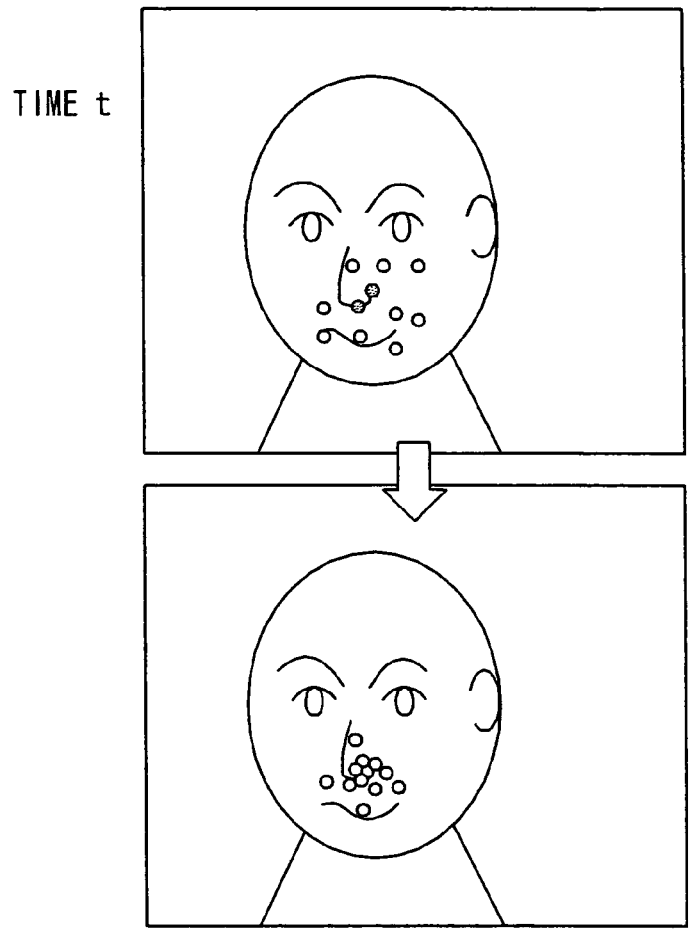
FIG. 12 is an illustrative diagram that indicates the tangible example of the operation (resampling) of the particle filter.

As shown in FIGS. 8 and 12, this transformation corresponds to drawing the particle randomly toward a position where the particle having the heavy weight exists, that is, a position where the particle has a large value in the estimation distribution. The particle that has been resampled in this manner is provided for the subordinate predicted distribution production part 11 and the mixing ratio setting part 18 as the particle that expresses the posterior probability distribution of the facial feature point.

The mixing ratio setting part 18 includes a subordinate predicted distribution parameter calculation part 19, a mixing ratio calculation part 20, and a mixing ratio holding part 21. The subordinate predicted distribution parameter calculation part 19 calculates subordinate predicted distribution parameters (the average and the variance) that define the subordinate predicted distribution. The subordinate predicted distribution parameters are calculated based on the particle (which has been produced at the subordinate predicted distribution production part 11) that conforms to the subordinate predicted distribution. The mixing ratio calculation part 20 calculates the mixing ratios $\alpha_{a,t+1}, \alpha_{z,t+1}$, which are to be used for a following estimation. The mixing ratios are calculated based on the superior predicted distribution parameters that have been calculated at the superior predicted distribution parameter calculation part 41, the subordinate predicted distribution parameters that have been calculated at the subordinate predicted distribution parameter calculation part 19, and the particle (which has been produced at the resampling part 26) that conforms to the estimation distribution. The mixing ratio holding part 21 holds the mixing ratios $\alpha_{a,t+1}, \alpha_{z,t+1}$, which have been calculated at the mixing ratio calculation part 20. The mixing ratio holding part 21 subsequently provides the mixing ratios, which are derived from the previous result of the estimation, for the mixed distribution production part 14.

The mixing ratio calculation part 20 calculates the mixing ratios as those used for the following estimation, such that the mixed distribution produced from two (the superior and the subordinate) predicted distribution parameters best approximate the estimation distribution. The mixing ratios are calculated based on the particle (which has been resampled) that conforms to the estimation distribution, and on the two predicted distribution parameters.

More specifically, as an indicator of measurement of a distance between the above two distributions, a widely known Kullback-Leibler divergence, which is expressed in an equation (28), is employed. Then, such the mixing ratio $\alpha$ as minimizes the Kullback-Leibler divergence is derived. This question is reduced to a question of maximizing logarithmic likelihood $L(\alpha)$, which is expressed in an equation (29), that is, a question of deriving the mixing ratio $\alpha$ such that a derivative value of the logarithmic likelihood $L(\alpha)$ becomes zero, as shown in an equation (30).

$$KL(q(x(t)) | \pi(x(t)|\alpha)) \equiv \int q(x(t))\log\left(\frac{q(x(t))}{\pi(x(t)|\alpha)}\right) \quad (28)$$

$$L(\alpha) = \sum_{i=1}^{N} \log\pi(x_t^{(i)}|\alpha) \quad (29)$$

$$\frac{\partial L(\alpha)}{\partial \alpha} = 0 \quad (30)$$

Practically, the logarithmic likelihood $L(\alpha)$ (expressed in an equation (31)), into which a forgetting factor $\lambda_s$ ($0 \leq \lambda_s \leq 1$) is integrated to gradually obliterate influence of a previous inaccurate estimation, is employed.

$$L(\alpha) = \eta_t \sum_{\tau=1}^{t} \left( \prod_{s=\tau+1}^{t} \lambda_s \right) \sum_{i=1}^{N} \log\left( \sum_{m} p(\tilde{x}_\tau^{(i)}, m \mid \alpha) \right) \quad (31)$$

$$\eta_t = \left( \sum_{\tau=1}^{t} \left( \prod_{s=\tau+1}^{t} \lambda_s \right) \right)^{-1} \quad (32)$$

$$\sum_{m} p(\tilde{x}_t^{(i)}, m \mid \alpha) = \log \pi(\tilde{x}_t^{(i)} \mid \alpha) \quad (33)$$

$$p(\tilde{x}_t^{(i)}, m_a \mid \alpha) = \alpha_{a,t} p(\tilde{x}_t^{(i)} \mid a_t) \quad (34)$$

$$p(\tilde{x}_t^{(i)}, m_z \mid \alpha) = \alpha_{z,t} p(\tilde{x}_t^{(i)} \mid a_{t-1}, z_{1:t-1}) \quad (35)$$

However, the maximization of the equation (31) entails a laborious calculation due to its nonlinearity. Hence, maximization (expressed as a function of $\alpha$) of an equation (36), which is equivalent to the maximization (expressed as the function of $\alpha$) of the equation (31), is performed by means of an on-line EM (Expectation Maximization) algorithm. The equation (36) expresses the expected value (expected logarithmic likelihood) of predicted posterior distribution of an index variable m (a hidden variable that indicates which (the superior or the subordinate) predicted distribution a particle being considered is sampled from) in the logarithmic likelihood L ($\alpha$) that is expressed in the equation (31).

$$Q(\alpha \mid \alpha_t) = \eta_t \sum_{\tau=1}^{t} \left( \prod_{s=\tau+1}^{t} \lambda_s \right) \left( \sum_{i=1}^{N} \sum_{m} p(m \mid \tilde{x}_\tau^{(i)}, \alpha_\tau) \times \log p(\tilde{x}_\tau^{(i)}, m \mid \alpha) \right) \quad (36)$$

$$p(m_a \mid \tilde{x}_t^{(i)}, \alpha_t) = \frac{p(\tilde{x}_t^{(i)}, m_a \mid \alpha)}{p(\tilde{x}_t^{(i)}, m_a \mid \alpha) + p(\tilde{x}_t^{(i)}, m_z \mid \alpha)} \quad (37)$$

$$p(m_z \mid \tilde{x}_t^{(i)}, \alpha_t) = \frac{p(\tilde{x}_t^{(i)}, m_z \mid \alpha)}{p(\tilde{x}_t^{(i)}, m_a \mid \alpha) + p(\tilde{x}_t^{(i)}, m_z \mid \alpha)} \quad (38)$$

$$\frac{\partial Q(\alpha \mid \alpha_t)}{\partial \alpha} = 0 \quad (39)$$

Figure 13:
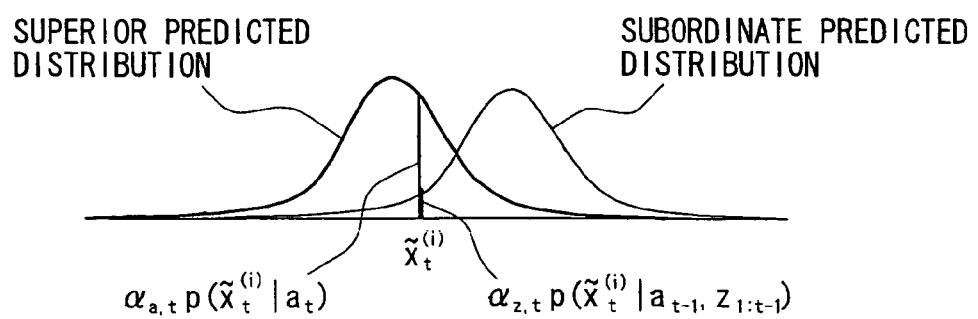
FIG. 13 is an illustrative diagram that indicates what a parameter, which is required for calculation of a mixing ratio, means.

Firstly, the EM algorithm calculates values (see FIG. 13) that are expressed in equations (37), (38) for the superior and subordinate predicted distributions respectively, based on each of the resampled particles by using the mixing ratios $\alpha_t = \{\alpha_{a,t}, \alpha_{z,t}\}$ that are currently set for estimation (E (Expectation)-STEP) at this time (at the time t).

Secondly, the EM algorithm calculates the mixing ratios $\alpha_a$, $\alpha_z$ by using values that have been calculated at the E-STEP, and equations (40) to (43) below. Then, the mixing ratios $\alpha_a$, $\alpha_z$ are used as the mixing ratios $\alpha_{a,t+1}$, $\alpha_{z,t+1}$ in producing the following mixed distribution (M (Maximization)-STEP).

$$\alpha_a = \frac{\langle\langle m_a \rangle\rangle_t}{\langle\langle m_a \rangle\rangle_t + \langle\langle m_z \rangle\rangle_t} \quad (40)$$

$$\alpha_z = \frac{\langle\langle m_z \rangle\rangle_t}{\langle\langle m_a \rangle\rangle_t + \langle\langle m_z \rangle\rangle_t} \quad (41)$$

$$\langle\langle m_a \rangle\rangle_t = (1 - \eta_t)\langle\langle m_a \rangle\rangle_{t-1} + \eta_t \sum_{i=1}^{N} p(m_a \mid \tilde{x}_t^{(i)}, \alpha_t) \quad (42)$$

$$\langle\langle m_z \rangle\rangle_t = (1 - \eta_t)\langle\langle m_z \rangle\rangle_{t-1} + \eta_t \sum_{i=1}^{N} p(m_z \mid \tilde{x}_t^{(i)}, \alpha_t) \quad (43)$$

In addition, two terms in a right side of the equation (36) express the probability distribution. By substituting the values calculated at the E-STEP for a left-hand term $p(m \mid x_\tau^{(i)}, \alpha_\tau)$ of these two terms, a part of the expected logarithmic likelihood (36) is rendered constant. Consequently, the equations (40) to (43) are derived through a solution of an equation (39) under a constraint condition $\alpha_{a,t+1} + \alpha_{z,t+1} = 1$ by use of the above expected logarithmic likelihood.

As a result, the mixing ratios $\alpha_{a,t+1}$, $\alpha_{z,t+1}$ derived in this manner emphasize the subordinate predicted distribution (prediction using the facial feature point) when prediction accuracy based on the subordinate predicted distribution (the estimation distribution of the facial feature point) is relatively high (i.e., the facial feature point is being successfully tracked). On the other hand, when the prediction accuracy based on the estimation distribution of the facial feature point is relatively low (i.e., the facial feature point is not being successfully tracked), the mixing ratios $\alpha_{a,t+1}$, $\alpha_{z,t+1}$ emphasize the superior predicted distribution (the prediction using the facial model).

As described above, the image processor 1 of the present embodiment estimates the affine parameter $a_t$ from the input image by means of a hierarchical model, which includes the lower and higher layers. The lower layer tracks (estimates the position of) the facial feature point x_{n} in the image plane using the particle filter. Using the Kalman filter, the higher layer estimates a process of the affine transformation from the results (obtained at the lower layer; the likelihood) of the estimations of the positions $x_t$ of the facial feature points into the facial model.

Furthermore, as predicted distribution that is used for estimating the facial feature point x_{n} at the lower layer, the image processor 1 employs the mixed distribution, which results from a mixture of the two (the superior and the subordinate) predicted distributions. The superior predicted distribution is based on a result $a_t$ of an estimation of the affine parameter at the higher layer. The subordinate predicted distribution is based on a result of the estimation of the facial feature point x_{n} at the lower layer. Besides, the image processor 1 dynamically changes the mixing ratios, such that the mixed distribution, which emphasizes the subordinate predicted distribution when the prediction accuracy of the subordinate predicted distribution is relatively high, and which emphasizes the superior predicted distribution when the prediction accuracy of the subordinate predicted distribution is relatively low, is produced. As a consequence of these dynamically changing mixing ratios, the above two layers complement each other when the prediction accuracy of either layer deteriorates.

A tracking (the estimation of the position) of the facial feature point x_{n} is likely to involve overlap of non-Gaussian noise. The image processor 1 employs the particle filter only for the tracking. As a result, the number of the particles that are used for the particle filter can be curbed, and moreover, a changing state in an actual environment, and influence of a relatively significant degree of noise can also be minimized.

At the lower layer, since the position of each facial feature point x_{n} can be highly accurately estimated, the subordinate predicted distribution ensures high accuracy. At the same time, the lower layer is characterized by the fact that influence of the noise (e.g., the facial feature point hidden by a hand and glasses/a considerable change in a direction of the driver's face/a change in a lighting condition) is likely to cause a relatively considerable deviation of the result (eventually, the subordinate predicted distribution) of the estimation. At the higher layer, an error due to a presupposition of the planar facial model, and influence of an accuracy deterioration in a single facial feature point upon the superior predicted distributions of all the facial feature points render it difficult to highly accurately predict each facial feature point from the result of the estimation of the affine parameter. At the same time, the higher layer is characterized by the fact that despite relatively significant influence of the noise on a part of the facial feature points, resulting superior predicted distribution does not considerably deviate by virtue of the estimation of the positions $x_t$ of the facial feature points as a whole. The mixed distribution, which is the mixture of the two predicted distributions having such complementary qualities, therefore has a combination of advantages of the two predicted distributions.

Hence, even if estimation accuracy of the subordinate predicted distribution deteriorates to a considerable degree because of, for example, a very different movement of the facial feature point from a presupposed motion model (the linear uniform motion), accuracy of the estimation of the facial feature point at the lower layer that uses the mixed distribution does not deteriorate significantly. The above very different movement is caused by cases, in which the part of the facial feature points is hidden by the hand, a drink or the like, and the driver rapidly changes (e.g., the driver turns his/her face from a front side toward a rearview mirror, and turns it back to the front) his/her head posture while driving. For this reason, the image processor 1 of the present embodiment can perform, with high reliability and robustness, the estimation of the affine parameter at the higher layer, and consequently, calculation of the driver's head posture on the basis of the affine parameter.

Figure 14:
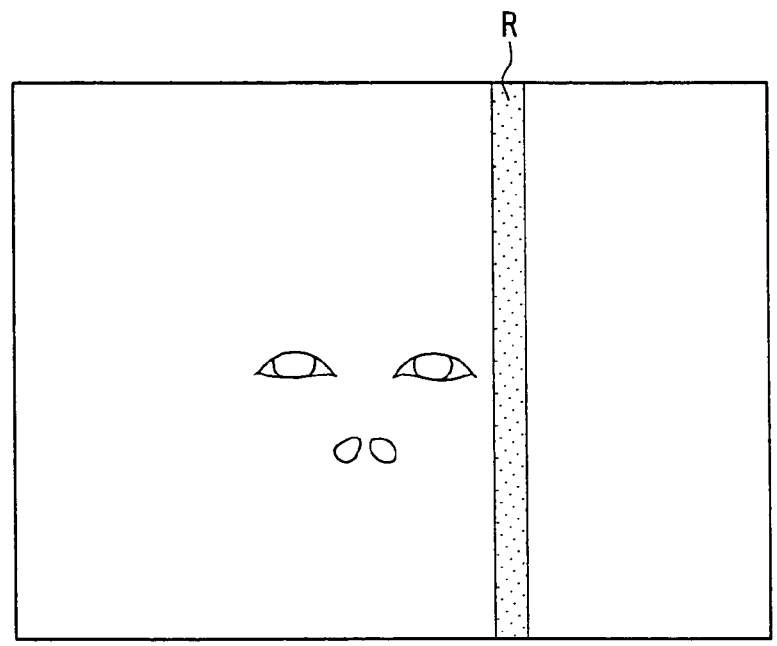
FIG. 14 is an illustrative diagram that indicates composition of an image that is used for estimation.

Besides, since the image processor 1 calculates the mixing ratios using the on-line EM algorithm, the image processor 1 allows dealing with the actual environment that is dynamically changing estimation is shown in FIG. 14.

An image of the driver's nostrils and both eyes is manually clipped from an image (a frontal facial image) taken when the driver faces front in an actual car interior. The above image is used for the template $tp^n$.

Additionally, it is presupposed that each facial part (the both eyes and the nose) is in the same plane as shown in FIG. 3, and that this plane rotates around the y-axis by a rotational angle (an angle of yaw) $\theta_y$, in order to produce a simulated image as will be described below.

More specifically, the angle of yaw of the head posture of the driver, who is shaking his/her head region from side to side, is continuously measured in the actual car interior. Based on a measuring result, the coordinate after the rotation for each instant of time is projected onto the image plane through perspective transformation. As shown in FIG. 14, positions (in the image plane obtained as a result of the projection) of respective centers of the both eyes and the nose, are replaced with the templates that have been clipped from the frontal facial image. A resulting image will be used for the simulated image. That is, in the simulated image, although the above positions of respective centers of the both eyes and the nose in the image change according to the angle of yaw for each instant of time, each facial part faces front at all times.

Moreover, a large noise area R, where the observed noise is relatively significant, is provided in the simulated image to simulate shielding (the hidden state of the part of the facial feature points by the hand, the drink or the like) in the car interior. The large noise area R covers the whole outer corner of a right eye in terms of its size and position, when the head posture is directed to the right.

To make real-time processing sufficiently feasible, the number (Np) of the particles that are used by the tracker $BK_n$, which tracks each facial feature point, is set at 50. Also, the forgetting factor $\lambda_s$ of the on-line EM algorithm, which is used for calculating the mixing ratios $\alpha_{a,t}, \alpha_{z,t}$, is set at 0.5. In addition, both $b_u$ and $b_v$ in the equation (26) are set at 7, and $D_f$ in the equation (27) is set at 0.15.

Figure 15:
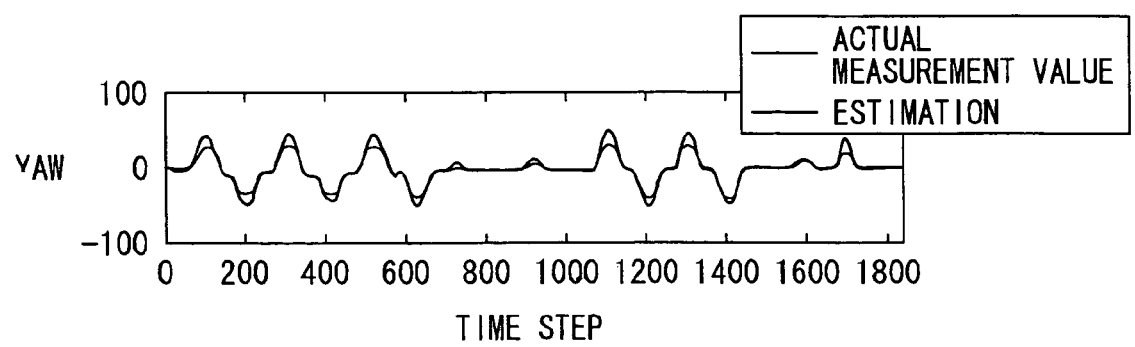
FIG. 15 is a diagram that indicates a result of calculation of an angle of yaw by means of the estimation.

The image processor 1 of the present embodiment is employed for a simulated image sequence produced as described above. The angle of yaw of the head posture restored from the affine parameter $a_t$, which has been estimated at the estimation unit 8, is shown in FIG. 15. In FIG. 15, it is indicated that the angle of yaw as a result of estimation shifts both in plus and minus directions with 0° (zero degrees) (that shows the driver looks to the front) being a centerline of fluctuation. It appears from FIG. 15 that a manner in which the driver shakes his/her head region from side to side is reliably estimated.

Figures 16A, 16B:
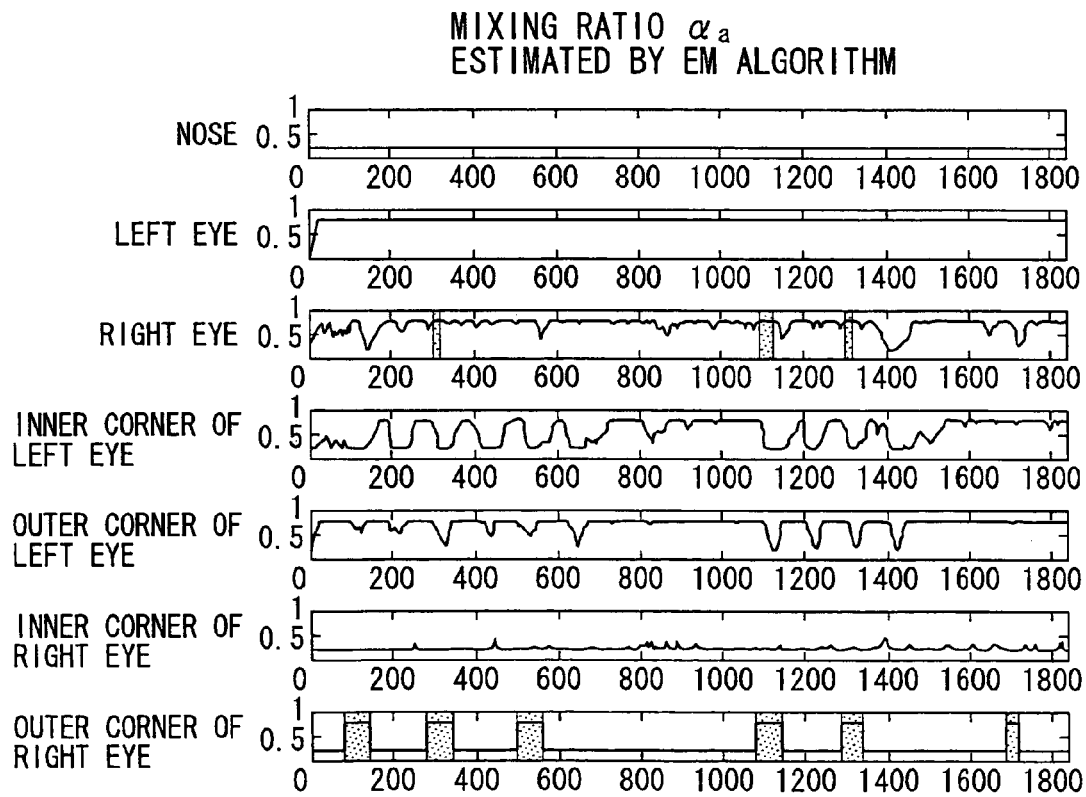
FIG. 16A is a table that indicates a head posture error, which is calculated based on a result of the estimation.
FIG. 16B is a diagram that indicates a result of the calculation of the mixing ratio of each facial feature point by means of an EM algorithm.

The estimation is subjected to trial 50 times. FIG. 16A indicates a mean estimated error (a mean squared error) and an average error standard deviation (which are derived based on a result of the estimation) of the head posture. For the purpose of comparison, FIG. 16A also indicates the result of the similar estimation when the mixing ratio $\alpha_{a,t}$ of the higher layer is fixed at 1 (i.e., only the superior predicted distribution is used) and at 0 (zero) (i.e., only the subordinate predicted distribution is used).

FIG. 16B shows the mixing ratio $\alpha_{a,t}$ that is calculated according to each facial feature point.

In FIG. 16B, a maximum of the mixing ratio $\alpha_{a,t}$ is fixed at 0.8, and a minimum of the mixing ratio $\alpha_{a,t}$ is fixed at 0.2. A gray area indicates that the facial feature point is hidden in the large noise area R in FIG. 14.

As shown in FIG. 16B, the mixing ratio $\alpha_{a,t}$ of the higher layer becomes high to produce the mixed distribution that emphasizes the superior predicted distribution (the prediction based on the facial model) while the right eye and the outer corner of the right eye are being hidden in the large noise area R. That is, the image processor 1 calculates the mixing ratio (consequently, produces the mixed distribution) that adapts to a state of the time, in response to a complex disturbance in the actual environment, and realizes an automatic tracking (which is accurate and robust against disturbances) of the facial feature point.

Additionally, in the present embodiment, the affine parameter prediction part 34 corresponds to "an estimation subject hidden state predicting means". The superior predicted distribution parameter calculation part 41 corresponds to "an intermediate hidden state predicting means based on the state transition structure of the hidden state of the estimation subject". The observation part 22 corresponds to "an intermediate hidden state likelihood observing means". The estimation distribution parameter calculation part 25 corresponds to "an intermediate hidden state estimating means". The calculator 31 corresponds to "an estimation subject hidden state likelihood observing means". The Kalman gain calculation part 32 and the affine parameter estimation part 33 correspond to "estimation subject hidden state estimating means". The subordinate predicted distribution production part 11 corresponds to "an intermediate hidden state predicting means based on the state transition structure of the intermediate hidden state". The mixed distribution production part 14 corresponds to "a mixing means". The mixing ratio setting part 18 corresponds to "a mixing ratio calculating means".

Other Embodiments

Thus far, one of embodiments of the present invention has been described. Nevertheless, the present invention is not limited to the above embodiment, and various embodiments can be employed without departing from the scope of the present invention.

For example, in the above embodiment, the image processor 1 is used for estimating a state of the driver's head region. The present invention is not limited to this embodiment, since the observed data except the input image may be used for estimating the hidden state of other states (than the state of the driver's head region).

In addition, as well as the facial feature point, any hierarchically expressible rigid body can be tracked as an application. Even more generally, provided that a hierarchical relationship between variables is ensured such that the estimation distribution and the predicted distribution are analytically integrable, a tracked object does not need to be limited to the rigid body, and data does not need to be limited to image data.

Lastly, by referring to FIGS. 17, 18, the operation of the estimation device of the present invention will be recapitulated below. In addition, a numeral (d) shown in FIG. 17 illustrates a causal relationship between an intermediate hidden state and an observable state.

Figure 17:
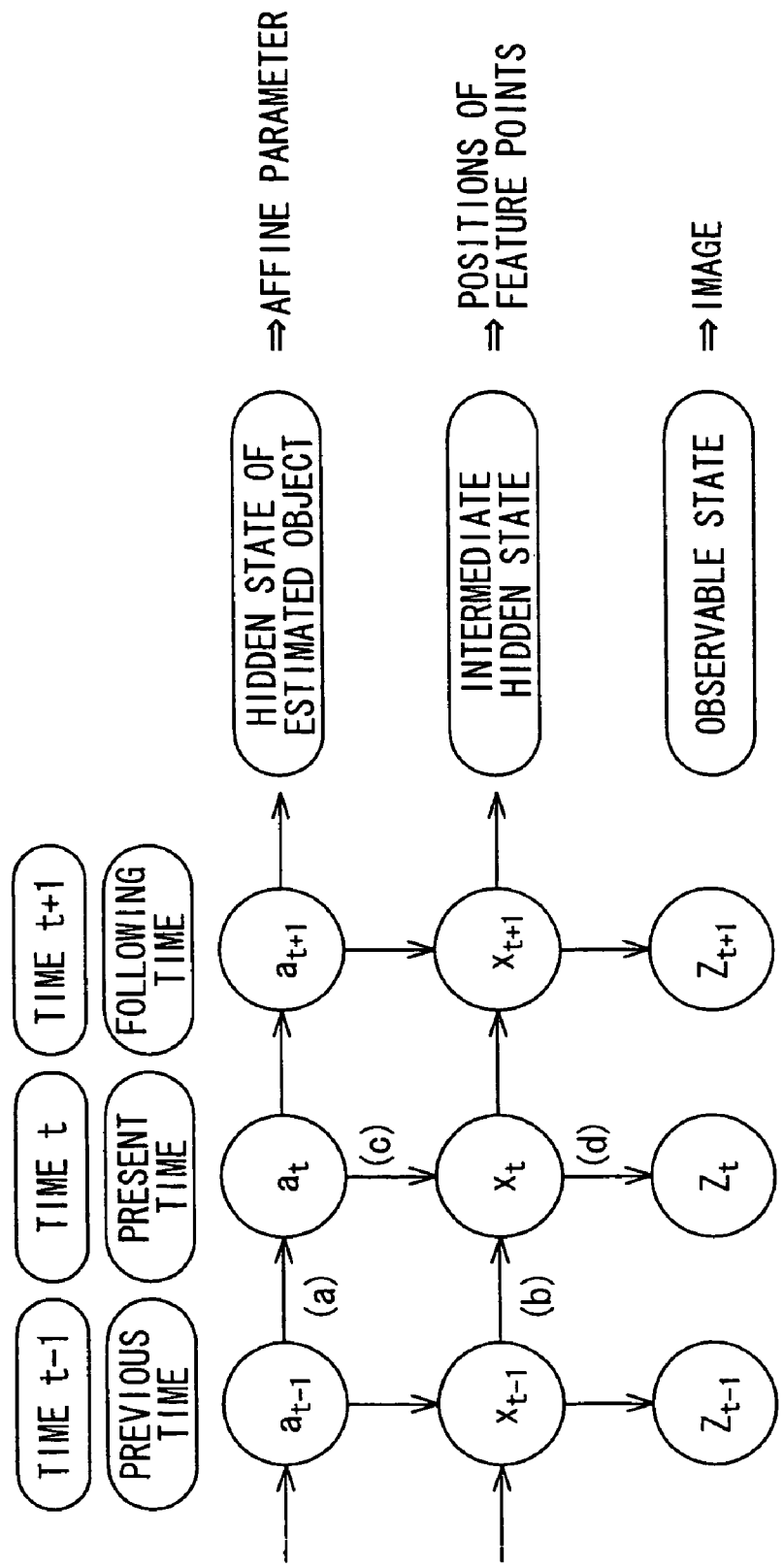
FIG. 17 is an illustrative diagram that helps comprehend terms that relate to a state transition structure.
Figure 18:
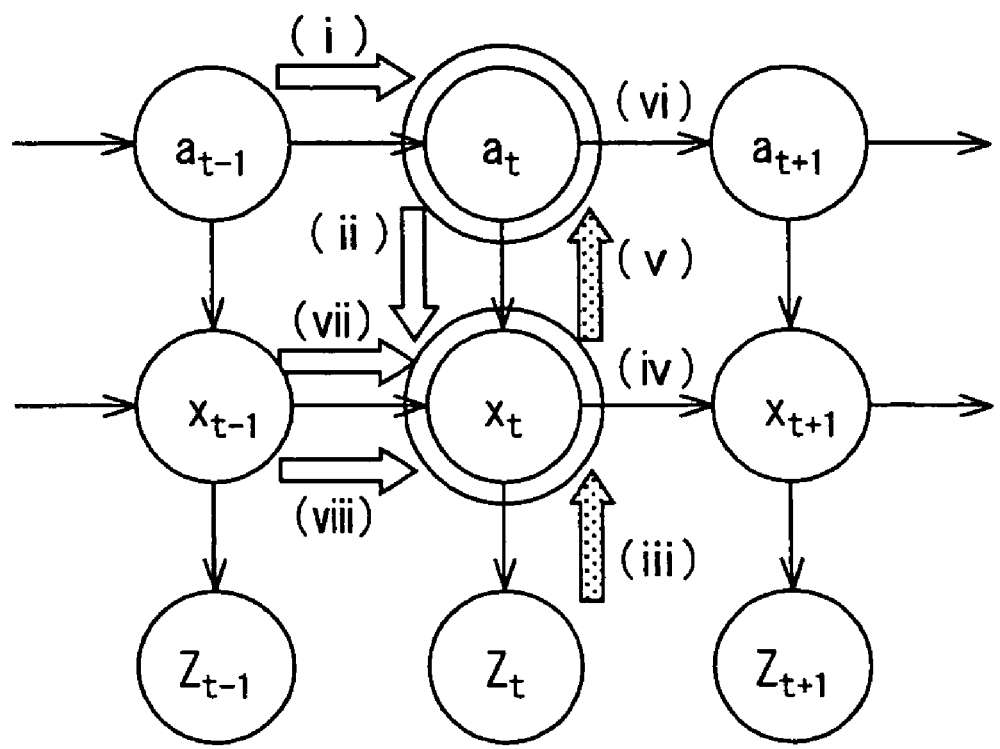
FIG. 18 is an illustrative diagram that indicates a relationship between information that is exchanged between states, and each device.

An estimation subject hidden state predicting means ((i) in FIG. 18) produces predictive information of the hidden state of the estimation subject at the present time $t(p(a_t|z_{1:t-1}))$ based on the estimation subject at the time t−1, and on a state transition structure of the hidden state of the estimation subject ((a) in FIG. 17), the state transition structure expressing the motion model of the hidden state of the estimation subject according to a time change.

Then, an intermediate hidden state predicting means based on the state transition structure of the hidden state of the estimation subject ((a); (ii) in FIG. 18) produces the predictive information of the intermediate hidden state based on the state transition structure of the hidden state of the estimation subject (a) at the time $t(p(x_t|a_t))$, using the predictive information of the hidden state of the estimation subject at the time $t(p(a_t|z_{1:t-1}))$, which is produced by the estimation subject hidden state predicting means (i) and a causal relationship ((c) in FIG. 17) between the hidden state of the estimation subject ($a_t$) and the intermediate hidden state ($x_t$).

Subsequently, an intermediate hidden state likelihood observing means ((iii) in FIG. 18) produces the likelihood of the intermediate hidden state at the time $t(p(z_t|x_t))$ using the predictive information of the intermediate hidden state at the time $t(\pi(x_t|a_t))$, which is produced by a mixing means ((viii) in FIG. 18) to hereinafter be described, and the observed data about the observable state at the time $t(z_t)$.

Following this, an intermediate hidden state estimating means ((iv) in FIG. 18) produces estimative information of the intermediate hidden state at the time $t(p(x_t|a_t, z_{1:t}))$ using the predictive information of the intermediate hidden state at the time $t(\pi(x_t|a_t))$, which is produced by the mixing means (viii) to hereinafter be described, and the likelihood of the intermediate hidden state at the time $t(p(z_t|a_t))$, which is produced by the intermediate hidden state likelihood observing means (iii).

Next, an estimation subject hidden state likelihood observing means ((v) in FIG. 18) produces the likelihood of the hidden state of the estimation subject at the time $t(p(x_t|a_t))$ using the estimative information of the intermediate hidden state at the time $t(p(x_t|a_t, z_{1:t}))$, which is produced by the intermediate hidden state estimating means (iv), and the predictive information of the hidden state of the estimation subject at the time $t(p(a_t|z_{1:t-1}))$, which is produced by the estimation subject hidden state predicting means (i).

In consequence, an estimation subject hidden state estimating means ((vi) in FIG. 18) produces the estimative information of the hidden state of the estimation subject at the time $t(p(a_t|z_{1:t}))$ using the predictive information of the hidden state of the estimation subject at the time $t(p(a_t|z_{1:t-1}))$, which is produced by the estimation subject hidden state predicting means (i), and the likelihood of the hidden state of the estimation subject at the time $t(p(x_t|a_t))$, which is produced by the estimation subject hidden state likelihood observing means (v).

Additionally, the intermediate hidden state predicting means based on the state transition structure of the hidden state of the estimation subject ((a); (ii)) produces the predictive information of the intermediate hidden state based on the state transition structure of the hidden state of the estimation subject (a) at the time $t(p(x_t|a_t))$ using the predictive information of the hidden state of the estimation subject at the time $t(p(a_t|z_{1:t-1}))$, and the causal relationship (c) between the hidden state of the estimation subject ($a_t$) and the intermediate hidden state ($x_t$). An intermediate hidden state predicting means based on the state transition structure of the intermediate hidden state ((b) in FIG. 17; (vii) in FIG. 18) produces the predictive information of the intermediate hidden state based on the state transition structure of the intermediate hidden state (b) at the time $t(p(x_t|a_{t-1}, z_{1:t-1}))$ using the estimative information of the intermediate hidden state at the time $t-1(p(x_{t-1}|a_{t-1}, z_{1:t-1}))$ and the state transition structure of the intermediate hidden state (b). The mixing means (viii) produces the predictive information of the intermediate hidden state at the time $t(\pi(x_t|a_t))$ by mixing the predictive information of the intermediate hidden state based on the state transition structure of the hidden state of the estimation subject (a) at the time $t(p(x_t|a_t))$, and the predictive information of the intermediate hidden state based on the state transition structure of the intermediate hidden state (b) at the time $t(p(x_t|a_{t-1}, z_{1:t-1}))$ according to the predetermined mixing ratio.

As a result, not only an estimation result at the time t−1 (i.e., the estimative information of the intermediate hidden state at the time $t-1(p(x_{t-1}|a_{t-1}, z_{1:t-1}))$) by the intermediate hidden state estimating means (iv), but also the estimation result at the time t−1 (i.e., the estimative information of the hidden state of the estimation subject at the time $t-1(p(a_{t-1}|z_{1:t-1}))$) by the estimation subject hidden state estimating means (vi) is reflected in the predictive information of the intermediate hidden state at the time $t(\pi(x_t|a_t))$, which is employed by the intermediate hidden state estimating means (iv).

Besides, the predictive information of the intermediate hidden state based on the state transition structure of the intermediate hidden state (b) at the time $t(p(x_t|a_{t-1}, z_{1:t-1}))$, which is derived from the estimative information of the intermediate hidden state at the time $t-1(p(x_{t-1}|a_{t-1}, z_{1:t-1}))$ by the state transition structure of the intermediate hidden state (b) is different from the predictive information of the intermediate hidden state based on the state transition structure of the hidden state of the estimation subject (a) at the time $t(p(x_t|a_t))$, which is derived from the estimative information of the hidden state of the estimation subject at the time $t-1(p(a_{t-1}|z_{1:t-1}))$ by the state transition structure of the hidden state of the estimation subject (a), and the causal relationship (c) between the hidden state of the estimation subject (a t) and the intermediate hidden state ($x_t$). For this reason, a problem that accuracy of both the predictive information of the intermediate hidden state based on the state transition structure of the intermediate hidden state (b) at the time $t(p(x_t|a_{t-1}, z_{1:t-1}))$ and the predictive information of the intermediate hidden state based on the state transition structure of the hidden state of the estimation subject (a) at the time $t(p(x_t|a_t))$ is considerably reduced simultaneously as a result of employing existing methods, can be solved.

Thus, according to the estimation device of the present invention, even if the accuracy of either one of the predictive information of the intermediate hidden state based on the state transition structure of the hidden state of the estimation subject (a) at the time $t(p(x_t|a_t))$ and the predictive information of the intermediate hidden state based on the state transition structure of the intermediate hidden state (b) at the time $t(p(x_t|a_{t-1}, z_{1:t}))$ is considerably reduced for some reasons (e.g., a complex movement of the facial feature point, variation in lighting, and a hidden facial feature point by an obstruction in a case where the observed data is the image, and the intermediate hidden state is expressed in the coordinates of the facial feature points, which are projected onto the image plane), its influence upon the predictive information of the intermediate hidden state at the time $t(\pi(x_t|a_t))$, which is produced by mixing both the predictive information is mitigated. Accordingly, influence of a changing state that occurs in an actual environment and a significant disturbance can be reduced, thereby realizing robust and accurate estimation.

In addition, the intermediate hidden state estimating means (iv) has a mixing ratio calculating means for calculating the mixing ratio between the predictive information of the intermediate hidden state based on the state transition structure of the hidden state of the estimation subject (a) at the time $t(p(x_t|a_t))$, and the predictive information of the intermediate hidden state based on the state transition structure of the intermediate hidden state (b) at the time $t(p(x_t|a_{t-1}, z_{1:t-1}))$. The mixing ratio is calculated, such that the estimative information of the intermediate hidden state at the time $t(p(x_t|a_t, z_{1:t}))$ is best approximated, based on the estimative information of the intermediate hidden state at the time $t(p(x_t|a_t, z_{1:t}))$, and on the predictive information of the intermediate hidden state based on the state transition structure of the hidden state of the estimation subject (a) at the time $t(p(x_t|a_t))$ and the predictive information of the intermediate hidden state based on the state transition structure of the intermediate hidden state (b) at the time $t(p(x_t|a_{t-1}, z_{1:t-1}))$, both of which have been used for producing the estimative information of the intermediate hidden state at the time $t(p(x_t|a_t, z_{1:t}))$. It is preferable that the intermediate hidden state estimating means (iv) should be configured, such that the mixing ratio, which has been calculated by the mixing ratio calculating means, is used for producing the predictive information of the intermediate hidden state at the time $t+1(\pi(x_{t+1}|a_{t+1}))$.

In calculating the mixing ratio to best approximate the estimative information of the intermediate hidden state at the time $t(p(x_t|a_t, z_{1:t}))$, the mixing ratio is calculated, such that the predictive information of the intermediate hidden state based on the state transition structure of the hidden state of the estimation subject (a) at the time $t(p(x_t|a_t))$, and the predictive information of the intermediate hidden state based on the state transition structure of the intermediate hidden state (b) at the time $t(p(x_t|a_{t-1}, z_{1:t-1}))$ are mixed, either one of them that has higher prediction accuracy being mixed in a higher ratio.

That is, according to the estimation device of the present invention, the mixing ratio between the predictive information of the intermediate hidden state based on the state transition structure of the hidden state of the estimation subject (a) at the time $t(p(x_t|a_t))$ and the predictive information of the intermediate hidden state based on the state transition structure of the intermediate hidden state (b) at the time $t(p(x_t|a_{t-1}, z_{1:t-1}))$ is dynamically changed according to the state in order that the predictive information with the higher prediction accuracy is mixed in the higher ratio, thereby realizing even more robust and accurate estimation.

Additionally, by the mixing ratio calculating means, a statistically desirable estimate value can be obtained online through employing the on-line EM algorithm in calculating the mixing ratio, so that a response can be made to varying data, which leads to more robustness of the present estimation device.

Besides, for example, the estimation subject hidden state estimating means (vi) may be configured such that the probability distribution of the hidden state of the estimation subject has linearity and Gaussianity. As well, the intermediate hidden state estimating means (iv) may be configured such that the probability distribution of the intermediate hidden state has nonlinearity and non-Gaussianity.

In such a case, it is preferable that the intermediate hidden state estimating means (iv) should employ the particle filter in producing the estimative information of the intermediate hidden state, and that the estimation subject hidden state estimating means (vi) should employ the Kalman filter in estimating the hidden state of the estimation subject.

In addition, in a case where the observed data is the image in which the face is captured, the hidden state of the estimation subject is expressed as the affine parameter that represents the head posture, and the intermediate hidden state is expressed in the coordinates of the facial feature points that represent characteristics of the face in the image, the estimation device of the present invention can be appropriately employed in configuring a drive assist system and the like to restrict a snooze and inattentive driving by estimating the driver's head posture.

Additional advantages and modifications will readily occur to those skilled in the art. The invention in its broader terms is therefore not limited to the specific details, representative apparatus, and illustrative examples shown and described.

What is claimed is:

1. An image processor, which outputs a result of an estimation of a hidden state of an estimation subject from an observable state in an image in a manner of a time series, wherein:
   the observable state is observed from the hidden state of the estimation subject under a procedure that has a hierarchical structure, wherein:
   the hierarchical structure includes:
      the hidden state of the estimation subject;
      the observable state; and
      an intermediate hidden state between the hidden state of the estimation subject and the observable state, wherein the intermediate hidden state has a causal relationship both with the hidden state of the estimation subject and with the observable state; and
   in the hierarchical structure:
      the hidden state of the estimation subject has a structure, in which a state transits according to a time change; and
      the intermediate hidden state also has the structure, in which the state transits according to the time change; and
   the image processor comprises:
      at least one camera, with which the image is continuously taken;
      an estimation part that is configured to process at least the image taken into the image processor and that includes the hierarchical structure;

means for producing predictive information of the hidden state of the estimation subject including an accuracy reduction due to disturbance at a present time t, using:
  estimative information of the hidden state of the estimation subject at a previous time t−1; and
  a state transition structure of the hidden state of the estimation subject;
means for producing predictive information of the intermediate hidden state based on the state transition structure of the hidden state of the estimation subject including the accuracy reduction due to the disturbance at the present time t, using:
  the predictive information of the hidden state of the estimation subject at the present time t; and
  the causal relationship between the hidden state of the estimation subject and the intermediate hidden state;
means for producing likelihood of the intermediate hidden state including an accuracy reduction due to disturbance at the present time t, using:
  observed data about the observable state at the present time t; and
  the predictive information of the intermediate hidden state at the present time t, wherein the structure of the intermediate hidden state, in which the state transits according to the time change, serves as a structure for limiting an accuracy reduction in the predictive information of the intermediate hidden state caused by the accuracy reduction due to the disturbance;
means for processing the predictive information;
means for producing estimative information of the intermediate hidden state at the present time t, using:
  the predictive information of the intermediate hidden state at the present time t; and
  the likelihood of the intermediate hidden state at the present time t;
means for producing likelihood of the hidden state of the estimation subject at the present time t, using:
  the estimative information of the intermediate hidden state at the present time t; and
  the predictive information of the hidden state of the estimation subject at the present time t;
means for producing the estimative information of the hidden state of the estimation subject at the present time t, using:
  the predictive information of the hidden state of the estimation subject at the present time t; and
  the likelihood of the hidden state of the estimation subject at the present time t; and
means for producing predictive information of the intermediate hidden state based on the state transition structure of the intermediate hidden state including the accuracy reduction due to the disturbance at the present time t, using:
  the estimative information of the intermediate hidden state at the previous time t−1; and
  the state transition structure of the intermediate hidden state, wherein:
  the predictive information of the intermediate hidden state at the present time t, the accuracy reduction of which is minimized, is produced by the processing means as a result of mixing two pieces of the predictive information according to a predetermined mixing ratio, the two pieces of the predictive information including:
    the predictive information of the intermediate hidden state based on the state transition structure of the hidden state of the estimation subject including the accuracy reduction due to the disturbance at the present time t; and
    the predictive information of the intermediate hidden state based on the state transition structure of the intermediate hidden state including the accuracy reduction due to the disturbance at the present time t.

2. The image processor according to claim 1, wherein:
means for limiting the accuracy reduction in the predictive information of the intermediate hidden state caused by the accuracy reduction due to the disturbance includes:
  means for calculating a mixing ratio between the two pieces of the predictive information, namely:
    the predictive information of the intermediate hidden state based on the state transition structure of the hidden state of the estimation subject at the present time t; and
    the predictive information of the intermediate hidden state based on the state transition structure of the intermediate hidden state at the present time t, wherein:
    the mixing ratio is calculated, such that the estimative information of the intermediate hidden state at the present time t is best approximated, based on:
      the estimative information of the intermediate hidden state at the present time t; and
      the two pieces of the predictive information, which have been used for producing the estimative information of the intermediate hidden state at the present time t, namely:
        the predictive information of the intermediate hidden state based on the state transition structure of the hidden state of the estimation subject at the present time t; and
        the predictive information of the intermediate hidden state based on the state transition structure of the intermediate hidden state at the present time t; and
    the mixing ratio, which has been calculated by the calculating means is used for producing the predictive information of the intermediate hidden state at a following time t+1.

3. The image processor according to claim 2, wherein the calculating means employs an on-line EM algorithm for calculating the mixing ratio.

4. The image processor according to claim 1, wherein the means for producing the estimative information of the intermediate hidden state employs a particle filter for producing the estimative information of the intermediate hidden state at the present time t.

5. The image processor according to claim 1, wherein the means for producing the estimative information of the hidden state employ a Kalman filter for producing the estimative information of the hidden state of the estimation subject at the present time t.

6. The image processor according to claim 1, wherein:
the observable state is expressed as an image, in which a face is captured;
the hidden state of the estimation subject is represented by an affine parameter $a_t$, which expresses a head posture; and
the intermediate hidden state is represented by coordinates of a plurality of feature points in an image plane, wherein the coordinates express positions of characteristic parts of the face in the image plane.

* * * * *